(12) United States Patent
Shetter

(10) Patent No.: US 6,342,890 B1
(45) Date of Patent: Jan. 29, 2002

(54) METHODS, APPARATUS, AND DATA STRUCTURES FOR ACCESSING SUB-PIXEL DATA HAVING LEFT SIDE BEARING INFORMATION

(75) Inventor: Martin T. Shetter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/272,413

(22) Filed: Mar. 19, 1999

(51) Int. Cl.$^7$ .............................................. G06T 11/00
(52) U.S. Cl. ...................................................... 345/467
(58) Field of Search ................................ 345/128–130, 345/141, 153, 192–194, 439, 467–472, 551, 552, 947, 948

(56) References Cited

U.S. PATENT DOCUMENTS

| | | | |
|---|---|---|---|
| 4,136,359 A | 1/1979 | Wozniak | 358/17 |
| 4,217,604 A | 8/1980 | Wozniak | 358/16 |
| 4,278,972 A | 7/1981 | Wozniak | 340/703 |
| 4,298,945 A * | 11/1981 | Kyte et al. | 364/523 |
| 4,345,245 A * | 8/1982 | Vella et al. | 340/744 |
| 5,057,739 A | 10/1991 | Shimada et al. | 313/477 R |
| 5,122,783 A | 6/1992 | Bassetti, Jr. | 340/701 |
| 5,254,982 A | 10/1993 | Feigenblatt et al. | 345/148 |
| 5,298,915 A | 3/1994 | Bassetti, Jr. et al. | 345/149 |
| 5,334,996 A | 8/1994 | Tanigaki et al. | 345/152 |
| 5,341,153 A | 8/1994 | Benzschawel et al. | 345/152 |
| 5,349,451 A | 9/1994 | Dethardt | 358/518 |
| 5,467,102 A | 11/1995 | Kuno et al. | 345/1 |
| 5,543,819 A | 8/1996 | Farwell et al. | 345/150 |
| 5,548,305 A | 8/1996 | Rupel | 345/150 |
| 5,555,360 A | 9/1996 | Kumazaki et al. | 395/143 |
| 5,590,247 A * | 12/1996 | Mikuni | 395/110 |
| 5,633,654 A | 5/1997 | Kennedy, Jr. et al. | 345/114 |
| 5,689,283 A | 11/1997 | Shirochi | 345/132 |
| 5,710,798 A | 1/1998 | Campana, Jr. | 375/347 |
| 5,710,880 A * | 1/1998 | Howlett et al. | 395/168 |
| 5,760,762 A * | 6/1998 | Tamamoto | 345/154 |
| 5,767,837 A | 6/1998 | Hara | 345/152 |
| 5,821,913 A | 10/1998 | Mamiya | 345/88 |
| 5,847,698 A | 12/1998 | Reavey et al. | 345/173 |
| 5,870,097 A | 2/1999 | Snyder et al. | 345/426 |
| 5,894,300 A | 4/1999 | Takizawa | 345/115 |
| 5,940,194 A | 8/1999 | Christie et al. | 359/15 |
| 5,949,643 A | 9/1999 | Batio | 361/681 |
| 5,952,994 A * | 9/1999 | Ong et al. | 345/127 |
| 5,963,175 A | 10/1999 | Havel | 345/83 |
| 6,188,385 B1 * | 2/2001 | Hill et al. | 345/136 |
| 6,236,390 B1 * | 5/2001 | Hitchcock | 345/149 |

OTHER PUBLICATIONS

"How Does Hinting Help?" http://www.microsoft.com/typography/hinting/how.htm/fname=%20&fsize, Jun. 30, 1997.

"The Raster Tragedy at Low Resolution" http://www.microsoft.com/typography/tools/trtalr.htm?fname=%20&fsize.

"The TrueType Rasterizer" http://www.microsoft.com/typography/what/raster.htm?fname=%20&fsize Jun. 30, 1997.

"TrueType fundamentals" http://www.microsoft.com/OTSPEC/TTCHO1.htm?fname=%20&fzide= Nov. 16, 1997.

"True Type Hinting" http://www.microsoft.com/typography/hinting/hinting.htm Jun. 30, 1997.

(List continued on next page.)

Primary Examiner—Almis R. Jankus
Assistant Examiner—G. F. Cunningham
(74) Attorney, Agent, or Firm—Workman, Nydegger & Seeley

(57) ABSTRACT

Techniques for accessing oversampled sub-pixels, also referred to as "source sub-pixels", such that the blocks of source sub-pixels to be accessed are shifted to account for a left side bearing remainder in the final display of the character. The source sub-pixels are accessed, efficiently, in blocks (or chunks) corresponding to the over-sampling rate.

25 Claims, 23 Drawing Sheets

OTHER PUBLICATIONS

Abram, G. et al. "Efficient Alias–free Rendering using Bit–masks and Look–Up Tables" *San Francisco*, vol. 19, No. 3, 1985 (pp. 53–59).

Ahumada, A.J. et al. "43.1: A Simple Vision Model for Inhomogenous Image–Quality Assessment" *1998 SID*.

Barbier, B. "25.1: Multi–Scale Fitlering for Image Quality on LCD Matrix Displays" *SID 96 Digest*.

Barten, P.G.J. "P–8: Effect of Gamma on Subjective Image Quality" *SID 96 Digest*.

Beck, D.R. "Motion Dithering for Increasing Perceived Image Quality for Low–Resolution Displays" *1998 SID*.

Bedford–Roberts, J. et al. "10.4: Testing the Value of Gray–Scaling for Images of Handwriting" *SID 95 Digest*, pp. 125–128.

Chen, L.M. et al., "Visual Resolution Limits for Color Matrix Displays" *Displays—Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Designs*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digial Image Processing Applications SPIE* vol. 1075 (1989) pp. 199–205.

Gille, J. et al. "Grayscale/Resolution Tradeoff for Text: Model Predictions" *Final Report*, Oct. 1992–Mar. 1995.

Gould, J.D. et al. "Reading From CRT Displays Can Be as Fast as Reading From Paper" *Human Factors*, vol. 29 No. 5, pp. 497–517, Oct. 1987.

Gupta, S. et al. "Anti–Aliasing Characters Displayed by Text Terminals" *IBM Technical Disclosure Bulletin*, May 1983 pp. 6434–6436.

Hara, Z. et al. "Picture Quality of Different Pixel Arrangements for Large–Sized Matrix Displays" *Electronics and Communications in Japan*, Part 2, vol. 77, No. 7, 1974, pp. 105–120.

Kajiya, J. et al. "Filtering High Quality Text For Display on Raster Scan Devices" *Computer Graphics*, vol. 15, No. 3, Aug. 1981, pp. 7–15.

Kato, Y. et al. "13:2 A Fourier Analysis of CRT Displays Considering the Mask Structure, Beam Spot Size, and Scan Pattern" (c) *1998 SID*.

Krantz, J. et al. "Color Matrix Display Image Quality: The Effects of Luminance and Spatial Sampling" *SID 90 Digest*, pp. 29–32.

Kubala, K. et al. "27:4: Investigation Into Variable Addressability Image Sensors and Display Systems" *1998 SID*.

Mitchell, D.P. "Generating Antialiased Images at Low Sampling Densities" *Computer Graphics*, vol. 21, No. 4, Jul. 1987, pp. 65–69.

Mitchell, D.P. et al., "Reconstruction Filters in Computer Graphics", *Computer Graphics*, vol. 22, No. 4, Aug. 1988, pp. 221–228.

Morris R.A., et al. "Legibility of Condensed Perceptually–tuned Grayscale Fonts" *Electronic Publishing, Artistic Imaging, and Display Typography*, Seventh International Conference on Electronic Publishing, Mar. 30–Apr. 3, 1998, pp. 281–293.

Murch, G. et al. "7.1: Resolution and Addressibility: How Much is Enough?" *SID 85 Digest*, pp. 101–103.

Naiman, A., "Some New Ingredients for the Cookbook Approaches to Anti–Aliased Text" *Proceedings Graphics Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast", *SID 96 Digest*.

Pringle, A., "Aspects of Quality in the Design and Production of Text", *Assocation of Computer Machinery* 1979, pp. 63–70.

"The Legibility of Screen Formats: Are Three Columns Better Than One?" http://fontweb/internal/repository/research/scrnformat.asp?RES=ultra, 16 pages, Jun. 3, 1998.

"Legibility on screen: A report on research into line length, document height and number of columns" http://fontweb/internal/repository/research/scrnlegi.asp?RES=ultra Jun. 3, 1998.

"Typographic Research" http://fontweb/internal/repository/research/research2.asp?RES=ultra Jun. 3, 1998.

Rohellec, J. Le et al. "35.2: LCD Legibility Under Different Lighting Conditions as a Function of Character Size and Contrast"*SID 96 Digest*.

Schmandt, C. "Soft Typography Information Processing 80", *Proceedings of the IFIP Congress*1980, pp. 1027–1031.

Sheedy, J.E. et al. "Reading Performance and Visual Comfort with Scale to Grey Compared with Black–and–White Scanned Print" *Displays*, vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID*.

Tung. C., "Resolution Enhancement Technology in Hewlett–Packard LaserJet Printers" *Proceedings of the SPIE –The International Society for Optical Engineering*, vol. 1912, pp. 440–448.

Warnock, J.E. "The Display of Characters Using Gray Level Sample Arrays", *Association of Computer Machinery*, 1980, pp. 302–307.

Whitted, T. "Anti–Aliased Line Drawing Using Brush Extrusion" *Computer Graphics*, vol. 17, No. 3, Jul. 1983, pp. 151,156.

Yu, S., et al., "43:3 How Fill Factor Affects Display Image Quality" (c) *1998 SID*.

"Cutting Edge Display Technology –The Diamond Vision Difference"www.amasis.com/diamondvision/technical.html, Jan. 12, 1999.

"The Effect of Line Length and Method of Movement on reading from screen" http://fontweb/internal/repository/research/linelength.asp!RES=ultra, 20 pages, Jun. 3, 1998.

"Exploring the Effect of Layout on Reading from Screen"http://fontweb/internal/repository/research/explore.asp!RES=ultra, 10 pages, Jun. 3, 1998.

* cited by examiner

FIG. 18D  Shifted First 32-Bit Register

FIG. 18E  First 32-Bit Register

FIG. 18F  Second 32-Bit Register

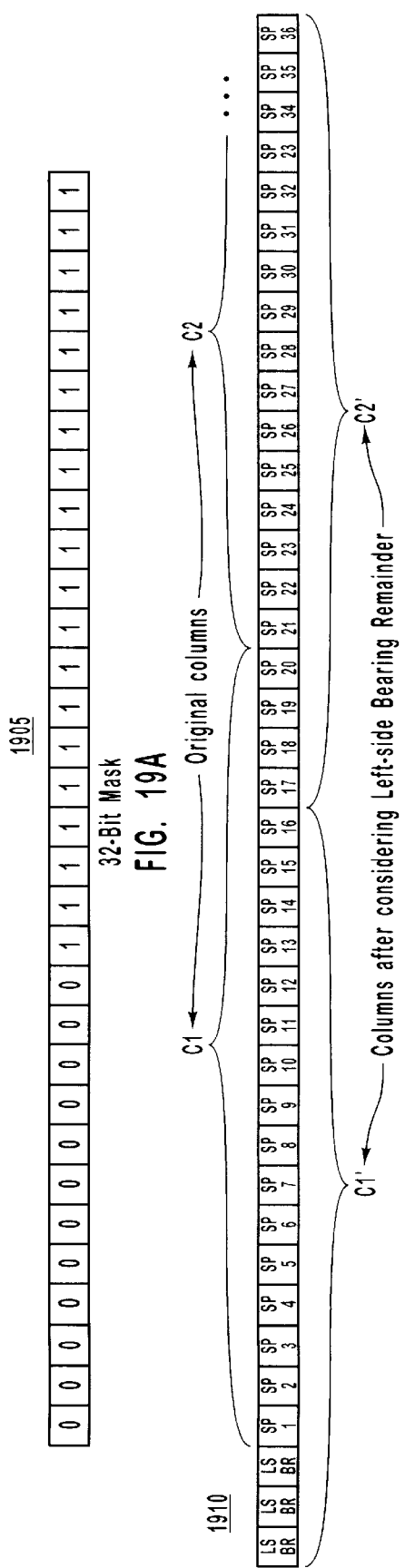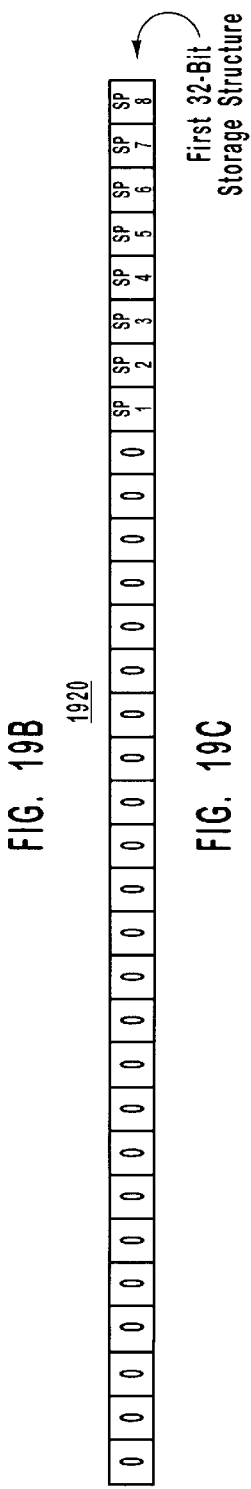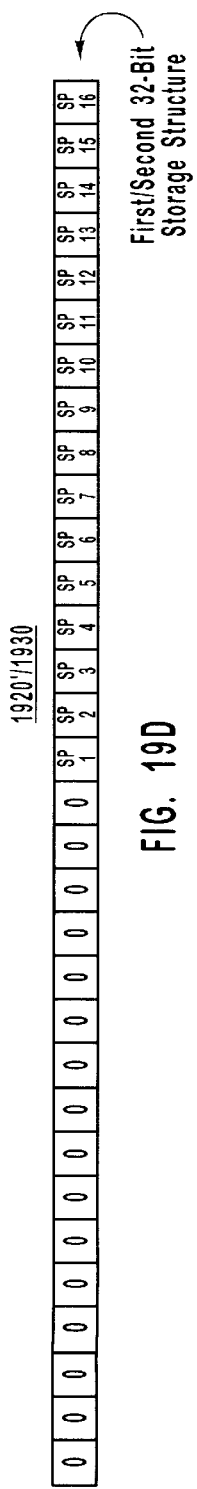
FIG. 19A 32-Bit Mask
FIG. 19B Columns after considering Left-side Bearing Remainder
FIG. 19C First 32-Bit Storage Structure
FIG. 19D First/Second 32-Bit Storage Structure

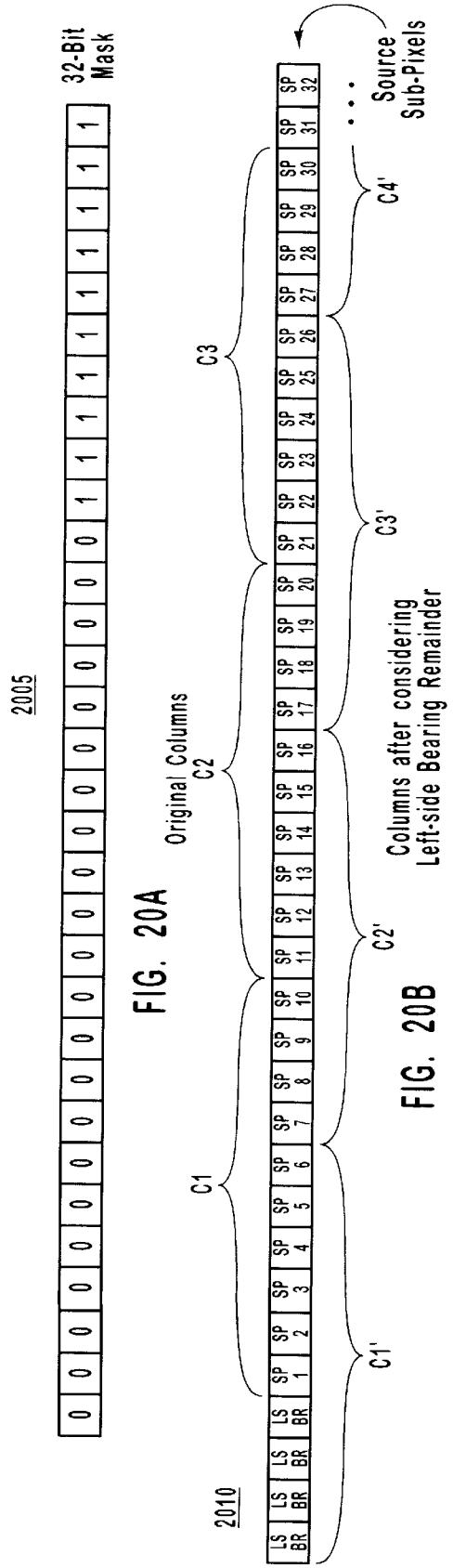
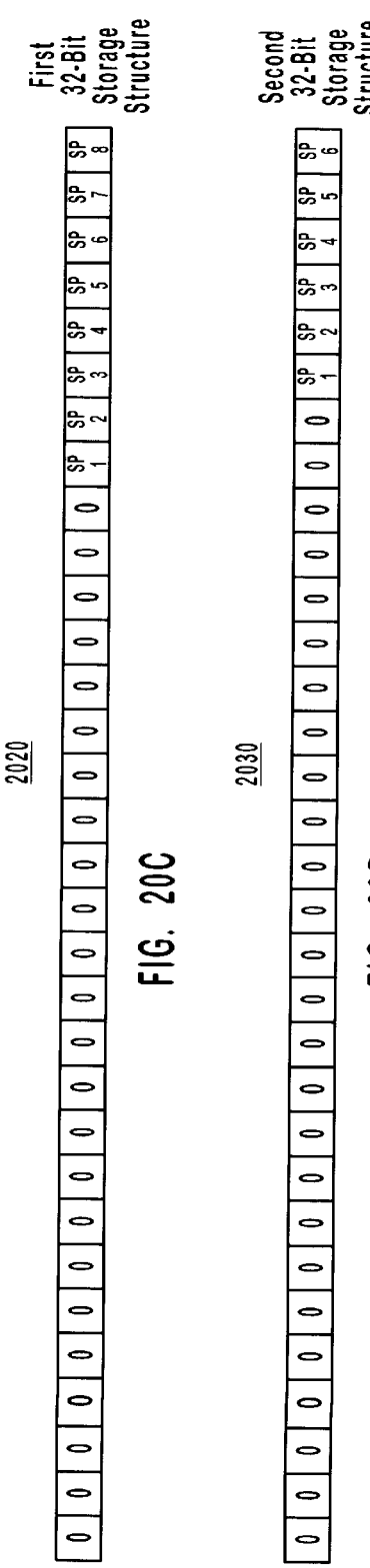
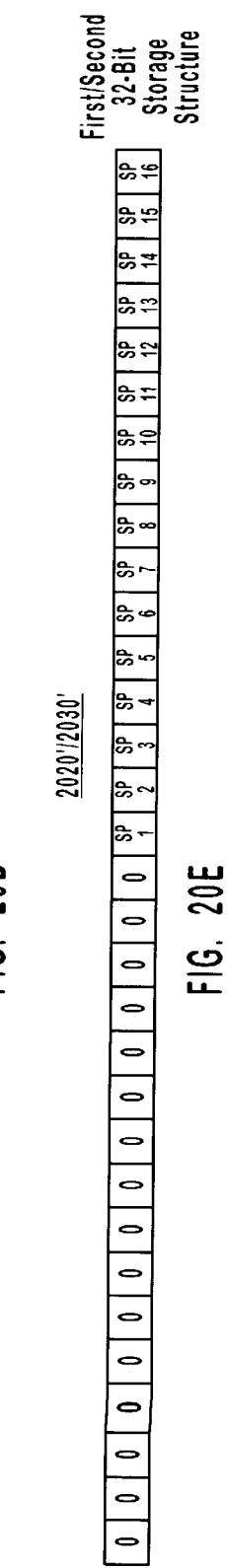
FIG. 20A
FIG. 20B
FIG. 20C
FIG. 20D
FIG. 20E

METHODS, APPARATUS, AND DATA STRUCTURES FOR ACCESSING SUB-PIXEL DATA HAVING LEFT SIDE BEARING INFORMATION

§ 1. BACKGROUND OF THE INVENTION

§ 1.1 Field of the Invention

The present invention concerns improving access to stored blocks of data, and in particular, concerns improving access to stored blocks of scaled sub-pixel data that includes an offset value. Once accessed, these blocks of scaled sub-pixel data are subjected to subsequent processing to produce more legible text on flat panel video monitors such as liquid crystal display (or LCD) video monitors.

§ 1.2 Related Art

The present invention may be used in the context of flat panel video monitors, such as LCD video monitors. In particular, the present invention may be used as a part of processing to produce more legible text on LCD video monitors. Color display devices have become the principal display devices of choice for most computer users. The display of color on a monitor is normally achieved by operating the display device to emit light (such as a combination of red, green, and blue light for example) which results in one or more colors being perceived by the human eye.

Although color video monitors in general, and LCD video monitors in particular, are known to those skilled in the art, they are introduced below for the reader's convenience. In § 1.2.1 below, cathode ray tube (or CRT) video monitors are first introduced. Then, in § 1.2.2 below, LCD video monitors are introduced.

§ 1.2.1 CRT VIDEO MONITORS

Cathode ray tube (CRT) display devices include phosphor coatings which may be applied as dots in a sequence on the screen of the CRT. A different phosphor coating is normally associated with the generation of different colors, such as red, green, and blue for example. Consequently, repeated sequences of phosphor dots are defined on the screen of the video monitor. When a phosphor dot is excited by a beam of electrons, it will generate its associated color, such as red, green and blue for example.

The term "pixel" is commonly used to refer to one spot in a group of spots, such as rectangular grid of thousands of such spots for example. The spots are selectively activated to form an image on the display device. In most color CRTs, a single triad of red, green and blue phosphor dots cannot be uniquely selected. Consequently, the smallest possible pixel size will depend on the focus, alignment and bandwidth of the electron guns used to excite the phosphor dots. The light emitted from one or more triads of red, green and blue phosphor dots, in various arrangements known for CRT displays, tend to blend together giving, at a distance, the appearance of a single colored light source.

In color displays, the intensity of the light emitted from the additive primary colors (such as red, green, and blue) can be varied to achieve the appearance of almost any desired color pixel. Adding no color, i.e., emitting no light, produces a black pixel. Adding 100 percent of all three colors produces a white pixel.

Having introduced color CRT video monitors, color LCD video monitors are now introduced in § 1.2.2 below.

§ 1.2.2 LCD VIDEO MONITORS

Portable computing devices (also referred to generally as computing appliance or untethered computing appliances) often use liquid crystal displays (LCDs) or other flat panel display devices, instead of CRT displays. This is because flat panel displays tend to be smaller and lighter than CRT displays. In addition, flat panel displays are well suited for battery powered applications since they typically consume less power than comparably sized CRT displays.

Color LCD displays are examples of display devices which distinctly address elements (referred to herein as pixel sub-components or pixel sub-elements) to represent each pixel of an image being displayed. Normally, each pixel element of a color LCD display includes three (3) non-square elements. More specifically, each pixel element includes adjacent red, green and blue (RGB) pixel sub-components. Thus, a set of RGB pixel sub-components together define a single pixel element.

Known LCD displays generally include a series of RGB pixel sub-components which are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB vertical stripes.

FIG. 1 illustrates a known LCD screen 100 comprising pixels arranged in a plurality of rows (R1–R12) and columns (C1–C16). That is, a pixel is defined at each row-column intersection. Each pixel includes a red pixel sub-component, depicted with moderate stippling, a green component, depicted with dense stippling, and a blue component, depicted with sparse stippling. FIG. 2 illustrates the upper left hand portion of the known display 100 in greater detail. Note how each pixel element, e.g., the (R1, C4) pixel element, comprises three distinct sub-element or sub-components, a red sub-component 206, a green sub-component 207 and a blue sub-component 208. Each known pixel sub-component 206, 207, 208 is ⅓, or approximately ⅓, the width of a pixel while being equal, or approximately equal, in height to the height of a pixel. Thus, when combined, the three ⅓ width, full height, pixel sub-components 206, 207, 208 define a single pixel element.

As illustrated in FIG. 1, one known arrangement of RGB pixel sub-components 206, 207, 208 form what appear to be vertical color stripes on the display 100. Accordingly, the arrangement of ⅓ width color sub-components 206, 207, 208, in the known manner illustrated in FIGS. 1 and 2, exhibit what is sometimes called "vertical striping".

In known systems, the RGB pixel sub-components are generally used as a group to generate a single colored pixel corresponding to a single sample of the image to be represented. More specifically, in known systems, luminous intensity values for all the pixel sub-components of a pixel element are generated from a single sample of the image to be represented. For example, referring to FIG. 3, an image is segmented into nine (9) squares by the grid 320. Each square of the grid defined by the segmented image represents an area of an image which is to be represented by a single pixel element. In FIG. 3, a shaded circle is used to represent a single image sample from which luminous intensity values associated with the red, green, and blue pixel sub-components 332, 333, and 334 of the associated pixel are generated.

Having introduced the general structure and operation of known LCD displays, known techniques for rendering text on such LCD displays, as well as perceived shortcomings of such known techniques, are introduced in § 1.2.2.1 below.

§ 1.2.2.1 RENDERING TEXT ON LCD DISPLAYS

Apart from pure image or video information, LCD displays are often used for rendering textual information. For example, a personal information manager may be used to render contact information, such as a person's address, telephone number, fax number, and e-mail address for example, on an untethered computing device. Character size and inter-character spacing are important factors when rendering text.

The expression of textual information using font sets is introduced in § 1.2.2.1.1 below. Then, the rendering of textual information using so-called pixel precision and perceived shortcomings of doing so are introduced in § 1.2.2.1.2 below. Finally, the desire to maintain formatting is described in § 1.2.2.1.3 below.

§ 1.2.2.1.1 FONT SETS

Inter-character spacing, both relative and absolute, can significantly impact the perceived quality of text. In addition, inter-character spacing may affect the format (or layout) of a textual file, such as a word processing file for example.

Many modern computer systems use font outline technology, such as scalable fonts for example, to facilitate the rendering and display of text. In such systems various font sets, such as "Times New Roman," "Onyx," "Courier New," etc. for example, may be provided. The font set normally includes a high resolution outline representation, such as lines, points and curves for example, for each character which may be displayed using the provided font set. The stored outline character representation normally does not represent space beyond the maximum horizontal and vertical boundaries of the character (also referred to as "white space"). Therefore, the stored character outline portion of a character font is often referred to as a black body (or BB). In addition to stored black body character outline information, a character font normally includes black body size, black body positioning, and overall character width information. Black body size information is sometimes expressed in terms of the dimensions of a bounding box used to define the vertical and horizontal borders of the black body.

Certain terms used to define a character are now defined with reference to FIG. 4, which illustrates the letters A and I 400. Box 408 is a bounding box which defines the size of the black body 407 of the character (A). The total width of the character (A), including white space to be associated with the character (A), is denoted by an advance width (or AW) value 402. The advance width typically starts to a point left of the bounding box 408. This point 404 is referred to as the left side bearing point (or LSBP). The left side bearing point 404 defines the horizontal starting point for positioning the character (A) relative to a current display position. The horizontal distance 410 between the left end of the bounding box 408 and the left side bearing point 404 is referred to as the left side bearing (or LSB). The left side bearing 410 indicates the amount of white space to be placed between the left end of the bounding box 408 of a current character (A) and the right side bearing point of the preceding character (not shown). The point 406 to the right of the bounding box 408 at the end of the advance width 402 is referred to as the right side bearing point (or RSBP). The right side bearing point 406 defines the end of the current character (A) and the point at which the left side bearing point 404' of the next character (I) should be positioned. The horizontal distance 412 between the right end of the bounding box 408 and the right side bearing point 406 is referred to as the right side bearing (or RSB). The right side bearing 412 indicates the amount of white space to be placed between the right end of the bounding box 408 of a current character (A) and the left side bearing point 404' of the next character (I).

As discussed above, a scalable font file normally includes black body size, black body positioning, and overall character width information for each supported character. The black body size information may include horizontal and vertical size information expressed in the form of bounding box 408 dimensions. The black body positioning information may expressed as a left side bearing value 410. Overall character width information may be expressed as an advance width 402.

§ 1.2.2.1.2 RENDERING TEXT TO PIXEL PRECISION

Most computer systems force the starting and ending points (Recall, for example, the left side bearing points and the right side bearing points, respectively) of characters being displayed to be positioned on pixel boundaries. In addition, such computer systems usually force or convert the black body width and the left side bearing to be integer multiples of the pixel size. In known implementations, these constraints are enforced by (i) scaling the size and positioning information included in a character font as a function of the point size to be used to display the character and (ii) then rounding the size and positioning values to integer multiples of the pixel size used in the particular display device. Using pixel size units as the minimum (or "atomic") distance unit produces what is called "pixel precision" since the values are accurate to the size of one (1) pixel.

Rounding size and positioning values of character fonts to pixel precision introduces changes, or errors, into displayed images. Each of these errors may be up to ½ a pixel in size (assuming that values less than ½ a pixel are rounded down and values greater than or equal to ½ a pixel are rounded up). Thus, the overall width of a character may be less precise than desired since the character's AW is (may be) rounded. In addition, the positioning of a character's black body within the total horizontal space allocated to that character may be sub-optimal since the left side bearing is (may be) rounded. At small point sizes, the changes introduced by rounding using pixel precision can be significant.

§ 1.2.2.1.3 MAINTAINING FORMATTING

Minor changes in the spacing of characters found in an existing document can affect formatting. Such formatting changes may be significant and are often not anticipated by the user. For example, changes in overall character width may change line and page breaks causing text to wrap in unexpected ways and/or to extend over multiple pages where previously the text did not.

§ 1.2.3 UNMET NEEDS

In view of the errors introduced when rounding character values to pixel precision as introduced in § 1.2.2.1.2 above, methods and apparatus to improve character spacing and positioning are needed to increase the legibility and perceived quality of text. It is desirable, from a backwards compatibility perspective, that at least some of the new methods and apparatus function to better position characters within predefined character spaces corresponding to those used in existing text files. In this manner, improvements in character positioning may be possible without affecting the formatting of existing documents.

§ 2 SUMMARY OF THE INVENTION

The present invention includes methods, apparatus, and data structures for accessing oversampled sub-pixels, also referred to as "source sub-pixels", such that the blocks of source sub-pixels to be accessed are shifted to account for a left side bearing remainder in the final display of the character. The source sub-pixels are accessed, efficiently, in blocks (or chunks) corresponding to the over-sampling rate.

§ 3 BRIEF DESCRIPTION OF THE DRAWINGS

FIGS. 18A through 18F illustrate an example of the operation of the exemplary method of FIG. 16.

FIGS. 19A through 19I illustrate an example of the operation of the exemplary method of FIG. 17, where the oversampling rate is greater than sixteen (16).

FIGS. 20A through 20E illustrate an example of the operation of the exemplary method of FIG. 17, where the oversampling rate is less than sixteen (16).

§ 4 DETAILED DESCRIPTION

The present invention concerns novel methods, apparatus and data structures used to access data, such as sub-pixel data while accounting for left side bearing data. The following description is presented to enable one skilled in the art to make and use the invention, and is provided in the context of a particular application and its requirements. Various modifications to the disclosed embodiments will be apparent to those skilled in the art, and the general principles set forth below may be applied to other embodiments and applications. Thus, the present invention is not intended to be limited to the embodiments shown.

The methods, apparatus and data structures of the present invention are described in the context of a system for improving the readability of text on flat panel screens. An overview of this system, as well as apparatus which may be used to effect the system and at least some aspects of the present invention, are described in § 4.1 below. Then, in § 4.2, functions which may be performed by the present invention are introduced. Next, exemplary processes, methods and data structures for performing the present invention are described in § 4.3. Thereafter, examples which illustrate operations of exemplary embodiments of the present invention are described in § 4.4. Finally, concluding remarks about the present invention are presented in § 4.5.

§ 4.1 EXEMPLARY ENVIRONMENT

To reiterate, the methods, apparatus and data structures of the present invention are described in the context of a system for improving the readability of text on flat panel screens (also referred to simply as "the text enhancement system"). An overview of this system is presented in § 4.1.2 below. Before that, however, exemplary apparatus which may be used to effect at least some aspects of the present invention, as well as the text enhancement system, are described in § 4.1.1.

§ 4.1.1 EXEMPLARY APPARATUS

Figure 5A:
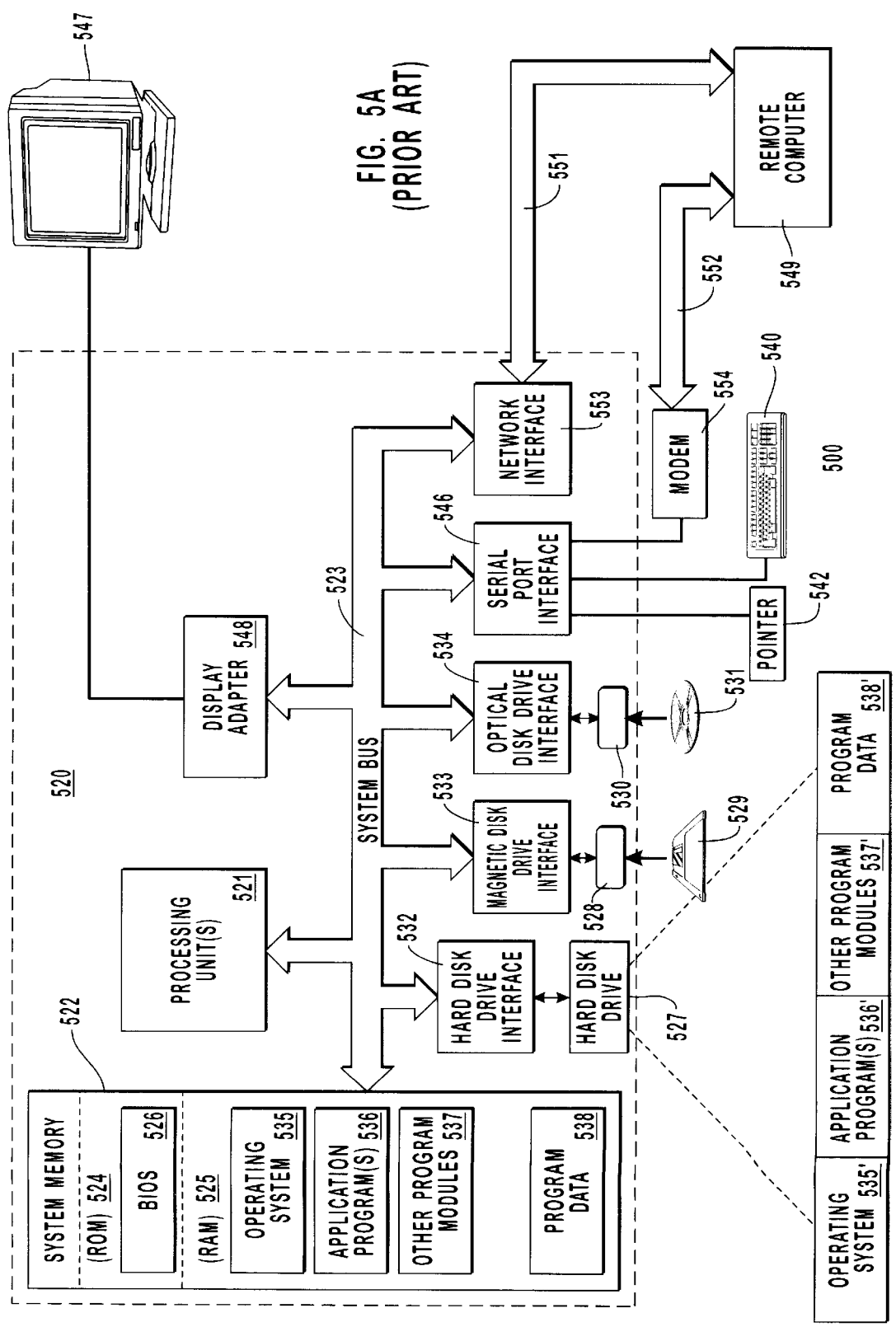
FIG. 5A is a block diagram of a computer system which may be used to implement at least certain aspects of the present invention.

FIG. 5A and the following discussion provide a brief, general description of an exemplary apparatus in which at least some aspects of the present invention, as well as the text enhancement system, may be implemented. Various methods of the present invention will be described in the general context of computer-executable instructions, such as program modules and/or routines for example, being executed by a computing device such as a personal computer. Other aspects of the invention will be described in terms of physical hardware such as display device components and display screens for example.

Naturally, the methods of the present invention may be effected by other apparatus than those described. Program modules may include routines, programs, objects, components, data structures e.g., look-up tables, etc. that perform task(s) or implement particular abstract data types. Moreover, those skilled in the art will appreciate that at least some aspects of the present invention may be practiced with other configurations, including hand held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

FIG. 5A is a block diagram of an exemplary apparatus 500 which may be used to implement at least some aspects of the present invention. A personal computer 520 may include a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. The system memory may include read only memory (ROM) 524 and/or random access memory (RAM) 525. A basic input/output system 526 (BIOS), including basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide non-volatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 523, magnetic disk 529, (magneto) optical disk 531, ROM 524 or RAM 525, such as an operating system 535, one or more application programs 536, other program modules 537, display driver 830, and/or program data 538 for example. The RAM 525 can also be used for storing data used in rendering images for display as will be discussed below. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus. However, input devices may be connected by other interfaces, such as a parallel port, a game port or a universal serial bus (USB). A monitor 547 or other type of display device may also be connected to the system bus 523 via an interface, such as a display adapter 548, for example. In addition to the monitor 547, the personal computer 520 may include other peripheral output devices (not shown), such as speakers and printers for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520, although only a memory storage device 550 has been illustrated in FIG. 5A. The logical connections depicted in FIG. 5A include a local area network (LAN) 551 and a wide area network (WAN) 552, an intranet and the Internet.

When used in a LAN, the personal computer 520 may be connected to the LAN 551 through a network interface adapter (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

Figure 5B:
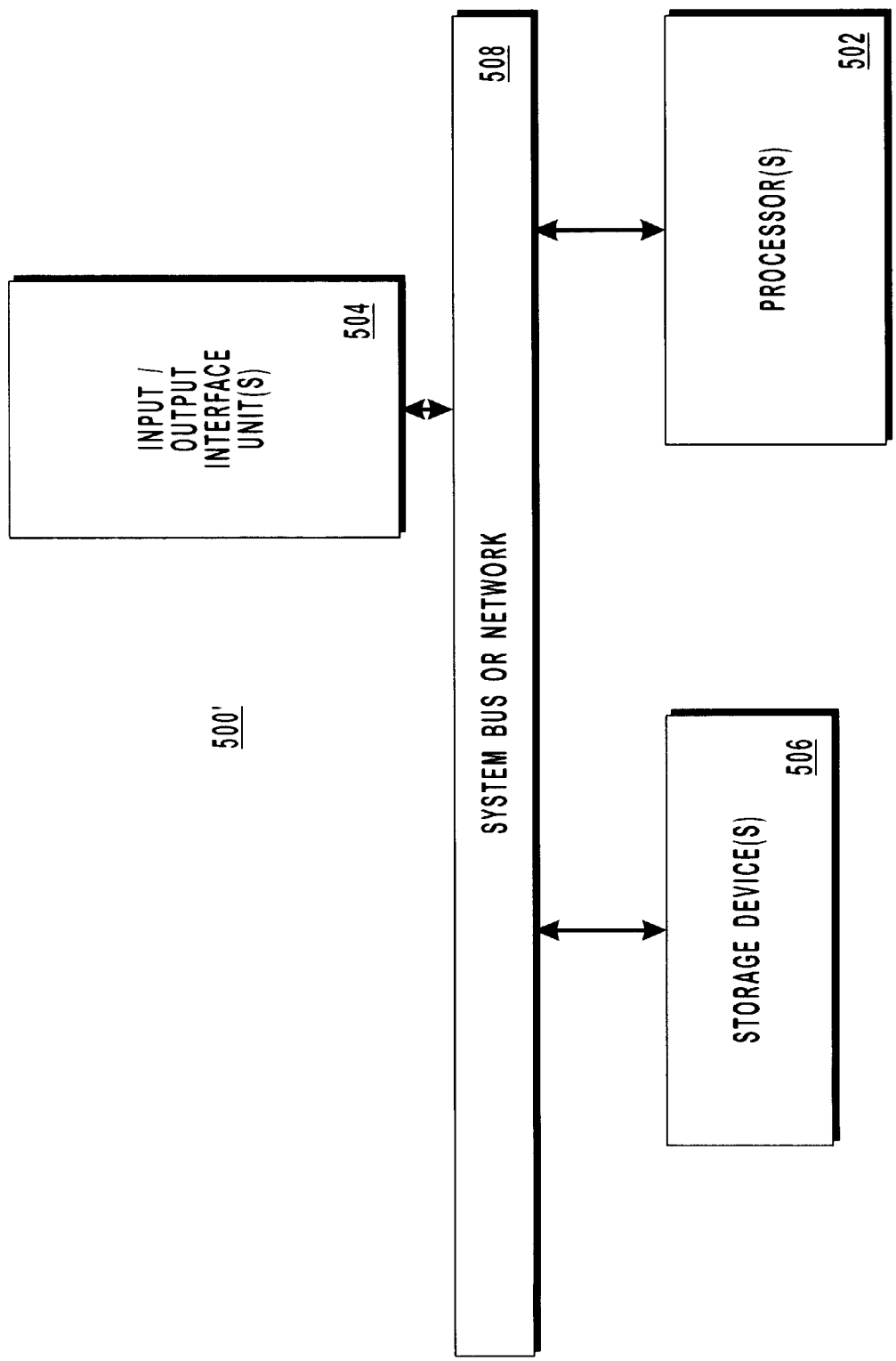
FIG. 5B is a high level block diagram of a machine which may be used to implement at least certain aspects of the present invention.

FIG. 5B is a more general machine 500' which may effect one or more of the processes discussed above. The machine 500' basically includes a processors) 502, an input/output interface unit(s) 504, a storage device(s) 506, and a system bus or network 508 for facilitating data and control communications among the coupled elements. The processors) 502 may execute machine-executable instructions to effect one or more aspects of the present invention, as well as aspects of the text enhancement system. At least a portion of the machine executable instructions and data structures may be stored (temporarily or more permanently) on the storage devices 506 and/or may be received from an external source via an input interface unit 504.

Having described exemplary apparatus on which at least some aspects of the present invention, as well as the text enhancement system, may be effected, an overview of the text enhancement system is now presented in § 4.1.2 below.

§ 4.1.2 TYPE ENHANCEMENT SYSTEM

Figure 3:
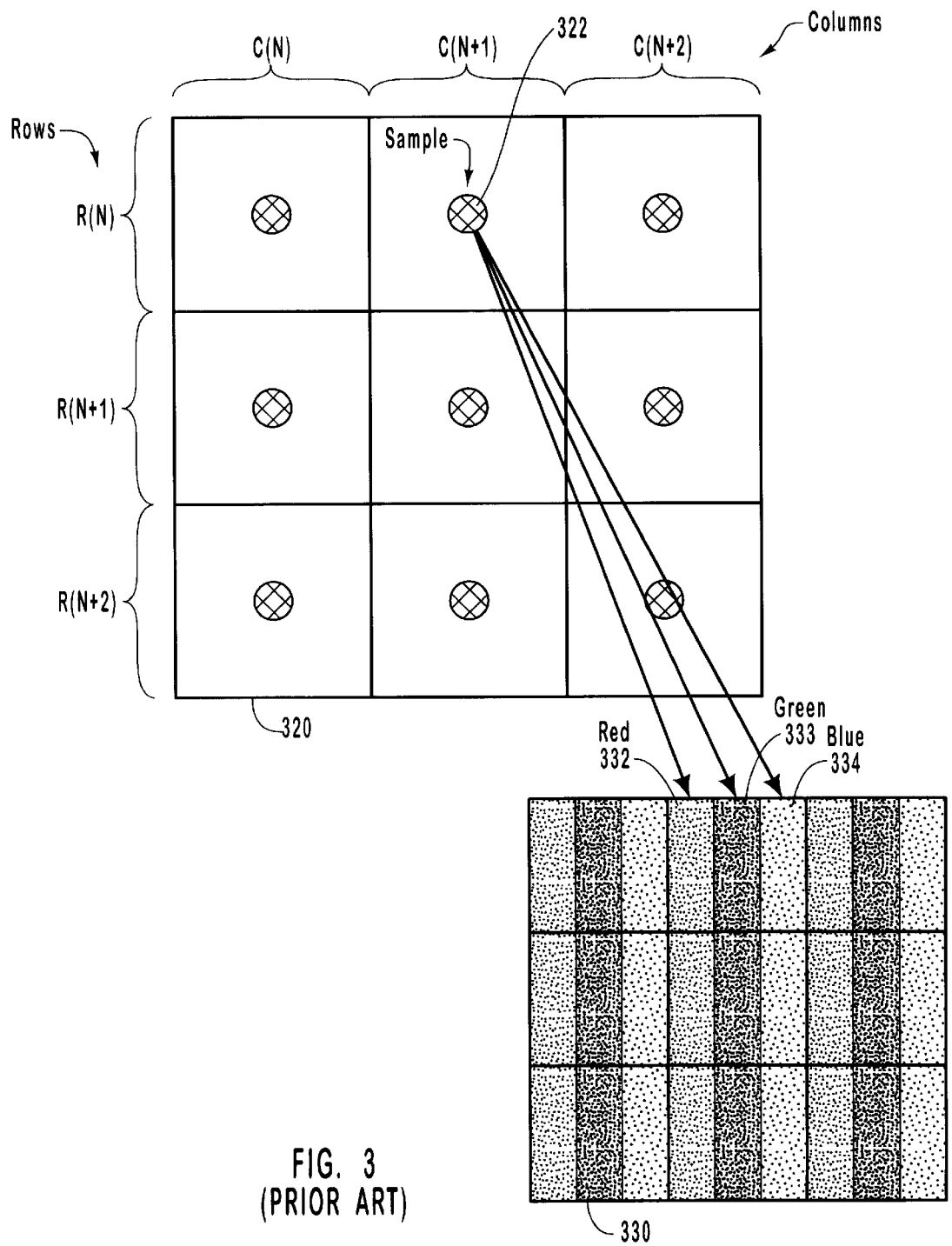
FIG. 3 illustrates a known image sampling operation.
Figure 4:
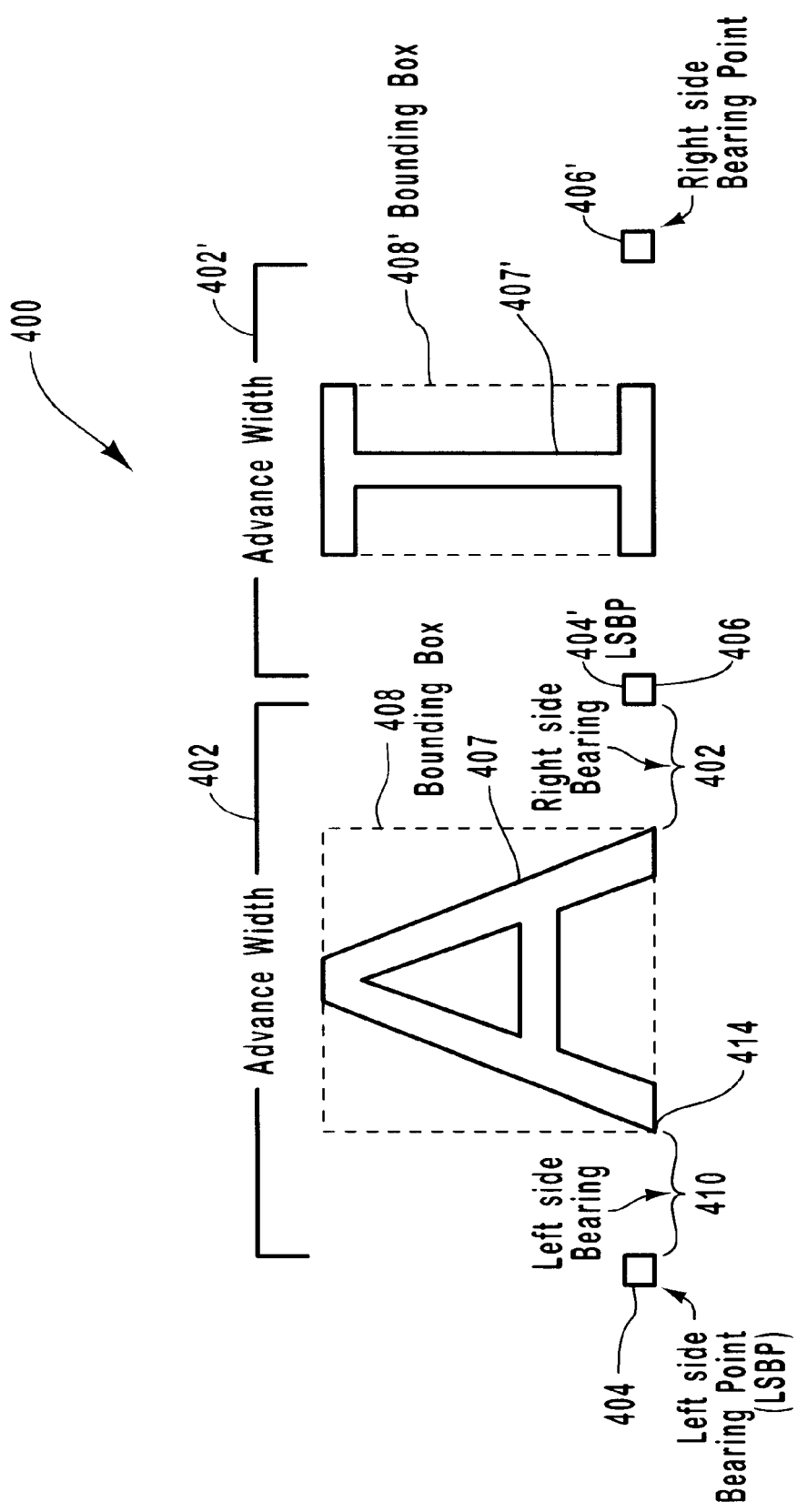
FIG. 4 illustrates known ways of representing character information.

Recall from FIG. 3, described in § 1.2.2 above, that most conventional scan conversion operations treat pixels as individual units into which a corresponding portion of an image can be mapped. Accordingly, in the case of conventional scan conversion operations, the same portion of an image, e.g., a pixel element sized portion, is used to determine the luminous intensity values to be used with each of the RGB pixel sub-components of a pixel element into which a portion of the scaled image is mapped.

Figure 6:
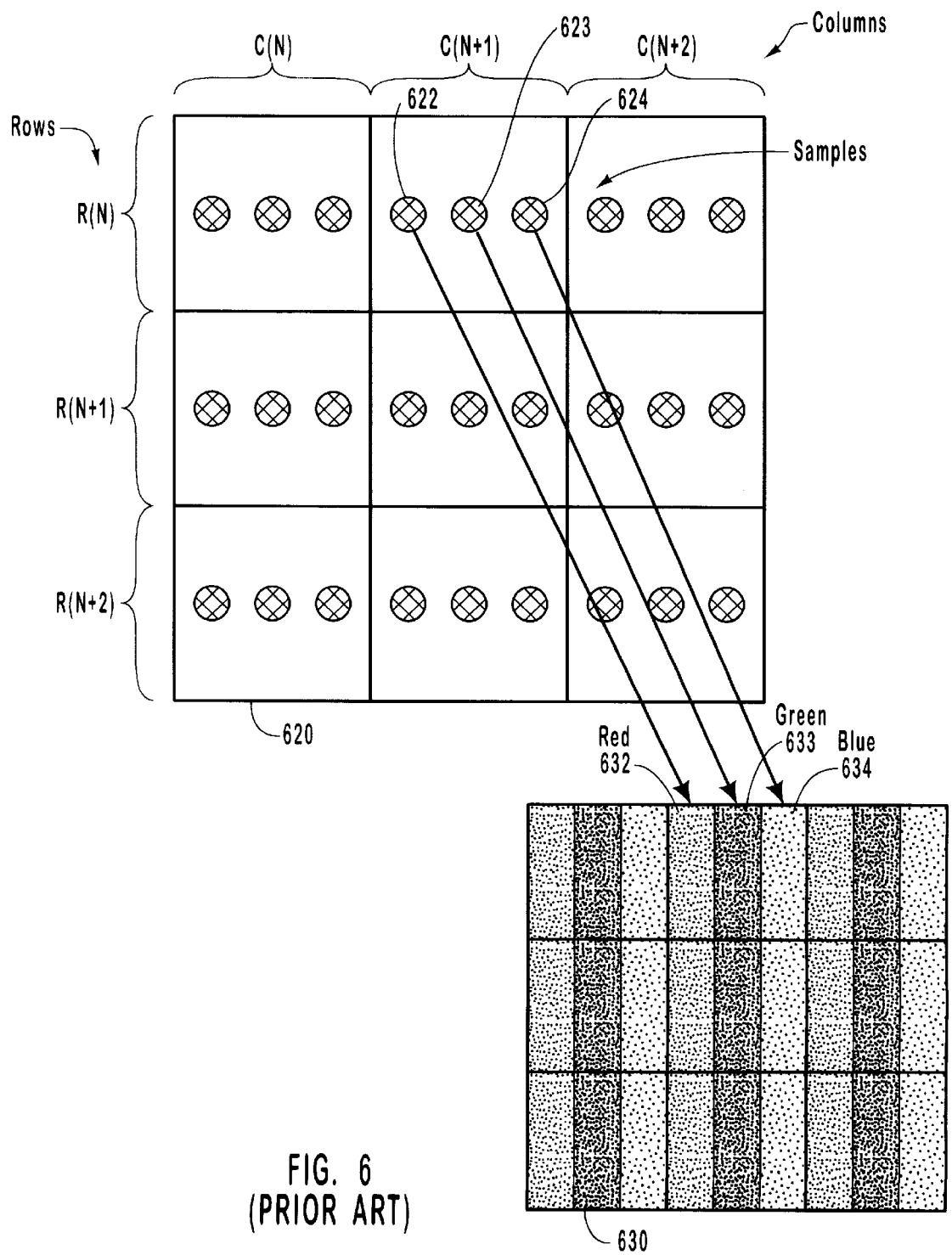
FIG. 6 illustrates an image sampling technique with which the present invention may be used.

In the text enhancement system, the RGB pixel sub-components of a pixel are treated as independent luminous intensity elements into which a different portion of the scaled image can be mapped. Thus, a higher degree of resolution than is possible with the known scan conversion techniques is provided. FIG. 6 illustrates an exemplary scan conversion operation implemented in accordance with an exemplary text enhancement system. In the illustrated embodiment, different image samples 622, 623, 624 of the image segmented by the grid 620 are used to generate the red, green and blue intensity values associated with corresponding portions 632, 633, 634 of the bitmap image 630 being generated. In the example illustrated in FIG. 6, image samples for red and blue are displaced $-\frac{1}{3}$ and $+\frac{1}{3}$ of a pixel width in distance from the green sample, respectively. Thus, the placement errors introduced when rounding to pixel precision described in § 1.2.2.1.2, encountered with the known sampling/image representation method illustrated in FIG. 3, are decreased to such an extent that any remaining placement errors are barely, if at all, perceptible.

Figure 7:
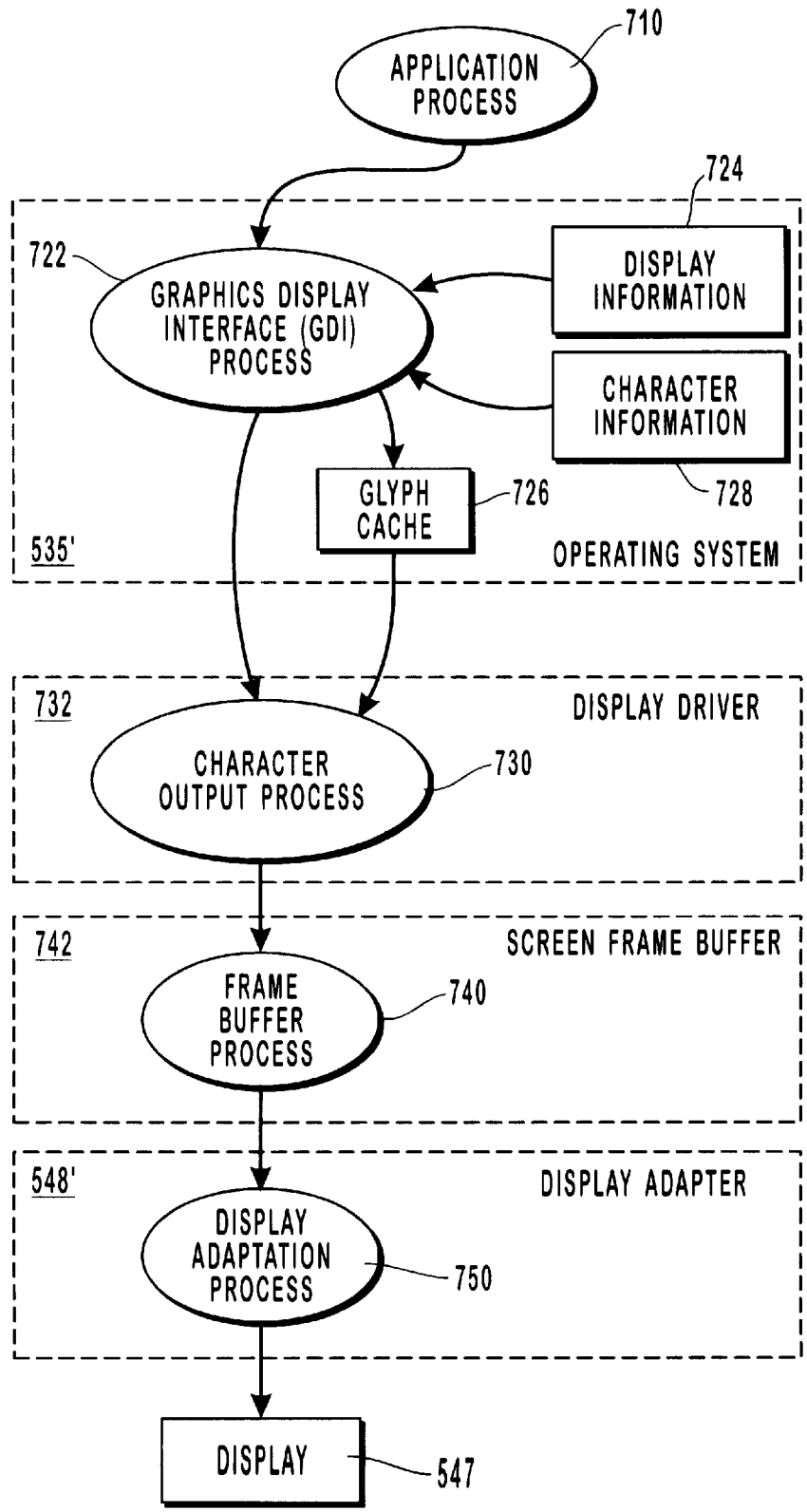
FIG. 7 is a diagram of high level processes of an environment in which the present invention may operate.

FIG. 7 is a high level diagram of processes which may be performed by the text enhancement system. As shown in FIG. 7, an application process, such as a word processor or contact manager for example, may request that text be displayed. The text is provided to a graphics display interface (or GDI) process (or more generally, a graphics display interface) 722. The GDI process 722 uses display information 724 and character information 728 to generate glyphs (or to access cached glyphs which have already been generated) to convert the text to glyphs. Glyphs may include a bit map of a scaled character type font (or a bounding box 408 containing black body 407 information), advance width 402 information, and left side bearing 410 information. The graphics display interface process 722 is described in more detail in § 4.1.2.1 below. The graphics display interface process 722, the display information 724, and the glyph cache 726 may be a part of, and effected by, an operating system 535', such as the Windows® CE or Windows NT® operating systems (from Microsoft Corporation of Redmond, Wash.) for example.

Glyphs, either from the glyph cache 726 or from the graphics display interface process 722, are then provided to a character output process 730 which converts the character glyph information into the actual RGB pixel sub-component luminous intensity values. The character output process 730 may be effected by a display driver 732. The display driver 732 may include a set of pre-computed look-up tables which may be used to perform a plurality of image processing operations. The character output process 730 receives, as input, glyphs and display information. The display information may include, for example, foreground/background color information, gamma value, color palette information and pixel value format information. The display information is used to select one of the look-up tables included in the set of look up tables to be used.

The look-up tables in the set of look-up tables are used for converting packed pixel values, used to represent the glyph, into processed pixel values. The processed pixel values are of a form, such as 8-bit R, G, and B luminous intensity values for example, which are used by the display adapter 548' and/or display device 547. Each look-up table includes one entry for each potential packed pixel value and a corresponding output value. In an exemplary case of 180 possible packed pixel values, a look-up table would include 180 packed pixel values and 180 corresponding processed, e.g., output, pixel values. Each output pixel value is a pre-computed value that is generated by performing the implemented display driver processing operations using the packed pixel value, to which the output pixel value corresponds, as input.

By using the packed pixel values representing a glyph as indexes into the look-up table, a set of processed pixel values including R, G, and B luminous intensity values, in the form utilized by the attached display adapter or display device, is obtained.

The processed pixel values included in the look-up table may be pre-computed, that is, computed before use in the display driver 732. By pre-computing the processed pixel values, the need to perform gamma correction, color compensation and/or palette selection operations in real time during image rendering is avoided.

An alternative method to the pixel value look-up table approach may be used as the character output process 730. Gamma correction, color compensation and/or palette selection operations may be performed using the packed pixel values as input to generate processed pixel values in a format suitable for use by the display adapter 548' and/or display 547.

The processed pixel values generated through display driver look-up table operation, or by the alternative method, are stored in the screen frame buffer 742 for output to the display adapter 548. Using the screen frame buffer 742 allows a single image of, e.g., a text string, to be generated from glyphs representing several different characters. Thus, character output data from the character output process 730 is provided to a frame buffer process 740 which stores the current frame of video to be displayed. The frame buffer process 740 may be effected by a screen frame buffer 742.

The video from the frame buffer process 740 is then provided to a display adaptation process 750 which adapts the video for a particular display device. The display adaptation process 750 may be effected by a display adapter 548'.

Finally, the adapted video is presented to the display device, such as an LCD display for example, 547 for rendering.

The text enhancement system is basically carried out in the graphics display interface process 722. The graphics display interface process 722 is now described in more detail in § 4.1.2.1 below.

§ 4.1.2.1 GRAPHICS DISPLAY INTERFACE

Figure 8:
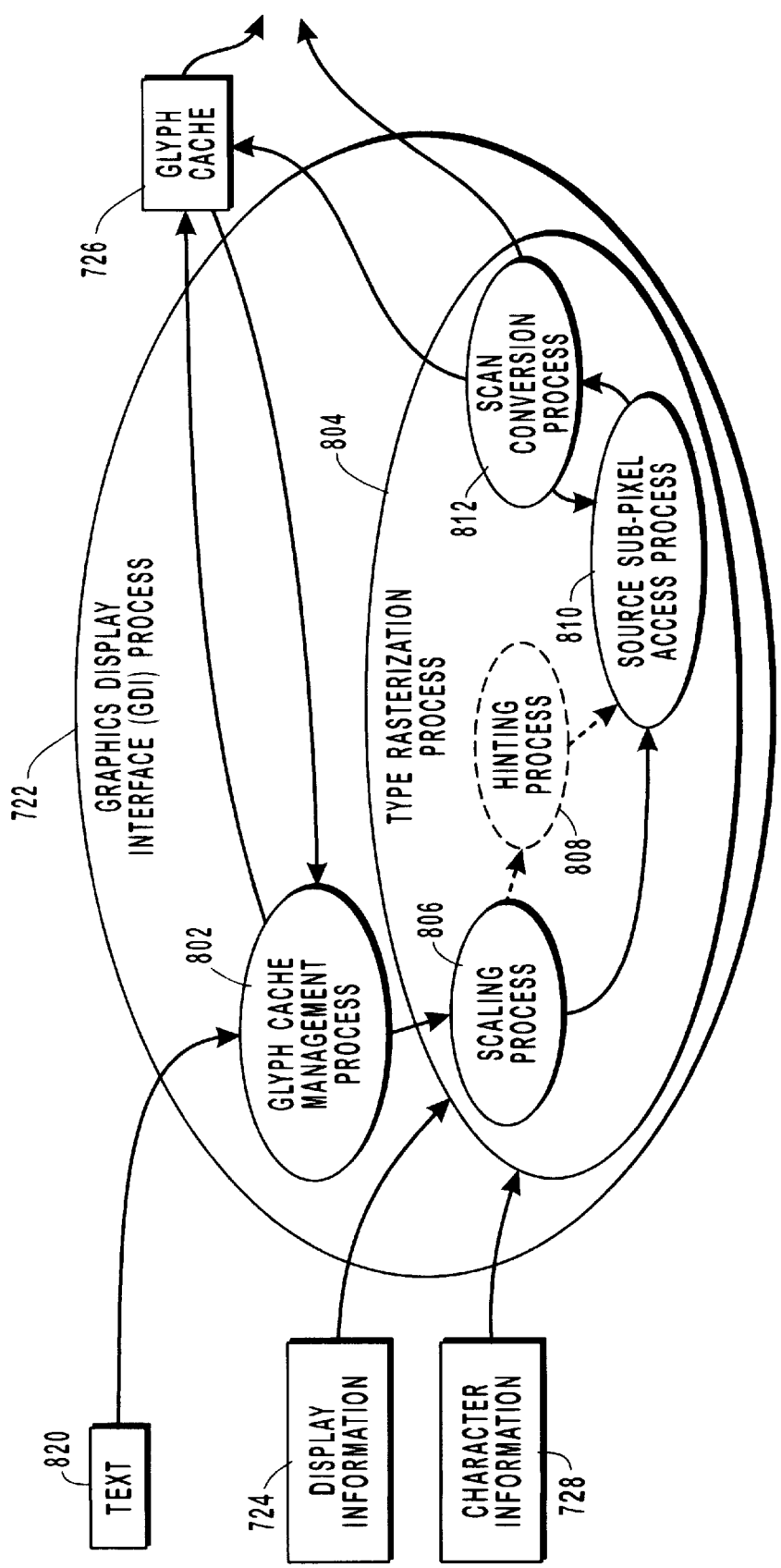
FIG. 8 is a diagram of graphics display interface processes of an environment in which the present invention may operate.

FIG. 8 illustrates processes that may be performed by a graphics display interface (or GDI) process 722, as well as data that may be used by the GDI process 722. As shown in FIG. 8, the GDI process 722 may include a glyph cache management process (or more generally, a glyph cache manager) 802 which accepts text, or more specifically, requests to display text, 820. The glyph cache management process 802 forwards this request to the glyph cache 726. If the glyph cache 726 includes the glyph corresponding to the requested text character, it provides it for downstream processing. If, on the other hand, the glyph cache 726 does not have the glyph corresponding to the requested text character, it so informs the glyph cache management process 802 which, in turn, submits a request to generate the needed glyph to the type rasterization process (or more generally, a type rasterizer) 804'. A type rasterization process is described in § 4.1.2.1.1 below.

§ 4.1.2.1.1 RASTERIZER

The type rasterization process 804 basically includes a scaling process (or more generally, a type scaler) 806, an optional hinting process (or more generally, a type hinter) 808, a source pixel access process (or more generally, a source pixel reader) 810 (to which the present invention is directed) and a scan conversion process (or more generally, a scan converter) 812. The scaling, hinting and scan conversion processes consider, use, or treat RGB pixel sub-components of a display as separate luminous intensity entities which can be used to represent different portions of an image to be rendered. The scaling process 806 is described in § 4.1.2.1.1.1 below. Then, the optional hinting process 808 is described in § 4.1.2.1.1.2 below. Finally, the scan conversion process 812 is described in § 4.1.2.1.1.3 below.

The input to these processes may include text, font, and point size information obtained from the application 710. In addition, the input may include display information 724. The display information 724 may include scaling information, foreground/background color information, gamma values, pixel size information, color palette information and/or display adapter/display device pixel value format information. The display information 724 may be obtained from monitor settings stored in memory 522 by the operating system 535. Finally, the input may also include character data, such as a high resolution representation, e.g., in the form of lines, points and/or curves, of the text characters to be displayed.

§ 4.1.2.1.1.1 SCALING

Figure 1:
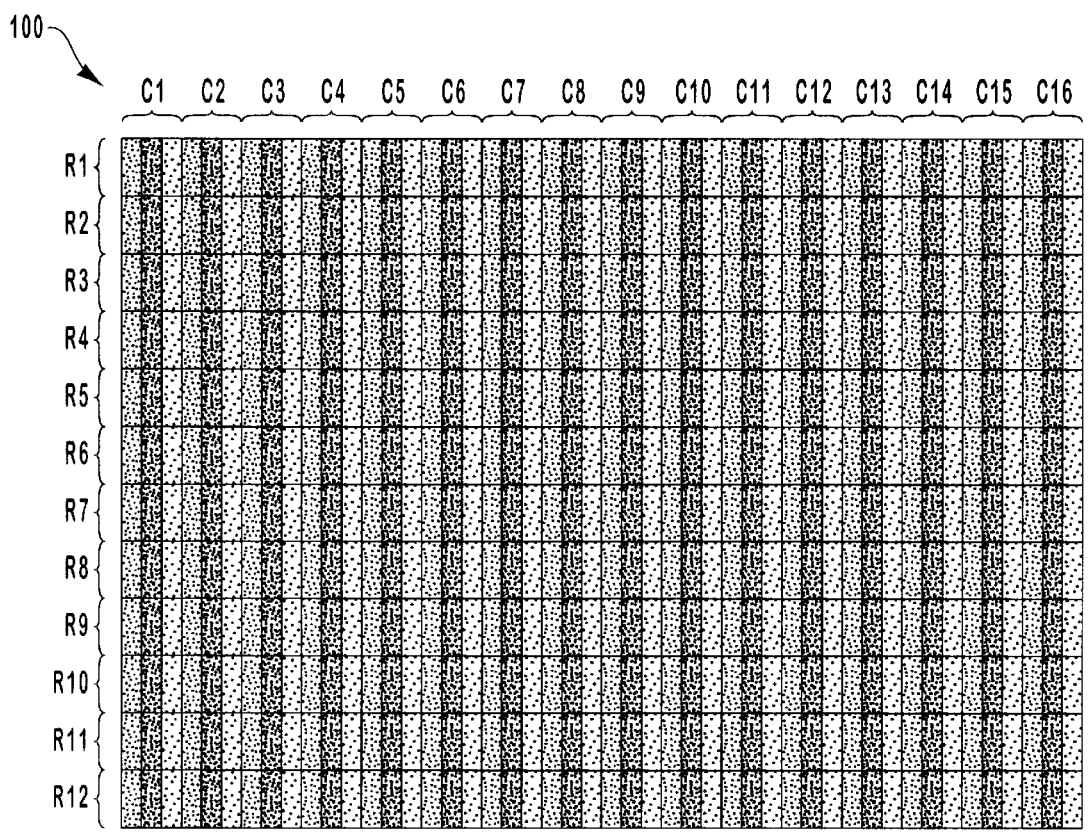
FIG. 1 illustrates a known arrangement of sub-pixel components on an LCD display.
Figure 2:
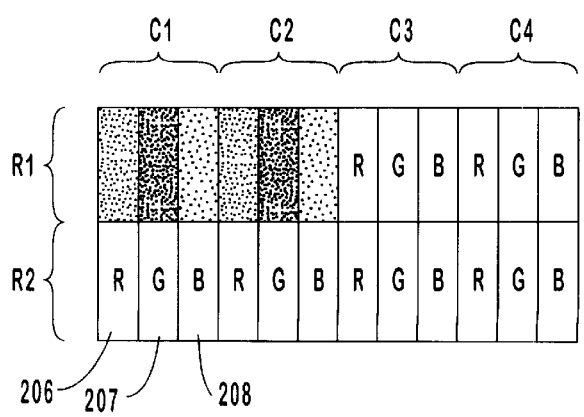
FIG. 2 illustrates a portion of FIG. 1 in greater detail.

The scaling process 806 may perform a non-square scaling based on the direction and/or number of pixel sub-components included in each pixel element. In particular, the high resolution character information 728 (Recall that this information may include line and point representation of characters to be displayed as specified by the received text and font information.) may be scaled in the direction perpendicular to the striping at a greater rate than in the direction of the striping. Thus, for example, when displays of the type illustrated in FIG. 1 are used as the device upon which data is to be displayed, scaling is performed in the horizontal direction at a rate that is greater than that performed in the vertical direction. This allows subsequent image processing operations to exploit the higher degree of resolution that can be achieved by using individual pixel sub-components as independent luminous intensity sources in accordance with the present invention.

The difference in scaling between the vertical and horizontal image directions can vary depending on the display used and the subsequent scan conversion process 812 and hinting process 808 to be performed. Display information including scaling information is used to determine the scaling to be performed in a given embodiment.

Figure 9:
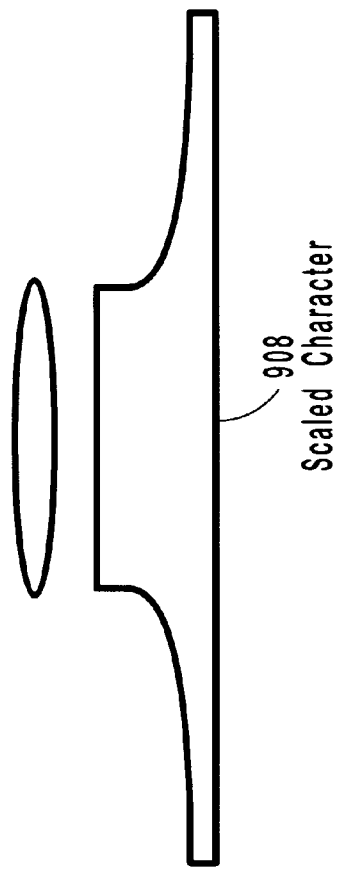
FIG. 9 illustrates an example of a character scaling operation.
Figure 9:
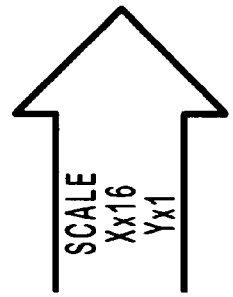
Figure 9:
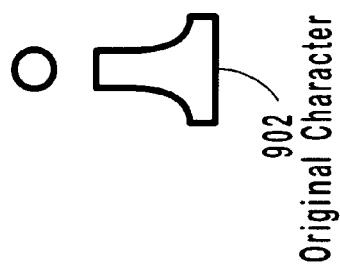

In most cases, the scaling of characters or images is, but need not be, performed in the direction perpendicular to the striping at a rate which allows further dividing of the red, green and blue stripes to thereby support a subsequent weighted scan conversion operation. In cases where a weighted scan conversion operation is to be applied, scaling is performed as a function of the RGB striping and the weighting used. In one embodiment with vertical striping where the red pixel component is allocated a weight of five (5), the green pixel sub-component allocated a weight of nine (9), and the blue pixel sub-component a weight of two (2), scaling is performed at a rate of one (1) times in the y direction and sixteen (16) times in the x direction. FIG. 9 illustrates such a scaling operation performed on a high resolution representation of the letter "i" 902 to be displayed on a monitor with vertical striping such as the one illustrated in FIG. 1. Note that in this example, scaling in the horizontal (X) direction is applied at a rate of sixteen (16) times while scaling in the vertical (Y) direction is applied at a rate of one (1) times. This results in a scaled character 908 that is just as tall as the original character 902 but sixteen (16) times wider.

In addition to the black box being scaled, the left side bearing 410 value and the advance width 402 value may also be scaled. Alternatively, these values may be re-determined in view of the scaling factor. In this alternative case, the resulting left side bearing 410 and advance width 402 values will not necessarily be even multiples of the horizontal (or X) direction sampling rate. For example, the left side bearing 410 value for the character to be rendered may be scaled based on a specified point size. Sub-pixel precision may be maintained, rather than merely rounding the left side bearing 410 value to the nearest pixel. Thus, the resulting left side bearing 410 value can have a portion which corresponds to an integer multiple of a pixel size unit and a remainder which is smaller than a pixel size unit. Similarly, the advance width 402 value for a character to be rendered may also be scaled based on a specified point size. Sub-precision may be used when scaling the advance width 402 value.

Referring back to FIG. 8, once the scaling process is performed, the optional hinting process 808 may be performed. This process 808 is described in § 4.1.2.1.1.2 below.

§ 4.1.2.1.1.2 HINTING

Basically, hinting aligns a scaled character, such as the character "i" 908 within a grid 1004 that is used by a subsequent scan conversion operation in a manner intended to optimize the accurate display of the character using the available pixel sub-components. Hinting also involves distorting image outlines so that the image better conforms to the shape of the grid 1004. The grid 1004 may be determined as a function of the physical size of pixel elements of the display device 547 and any weighting to be applied during the subsequent scan conversion process 812.

In the hinting alignment operation, pixel sub-component boundaries may be treated as boundaries along which characters can, and should, be aligned or boundaries to which the outline of a character should be adjusted.

In many cases, hinting involves aligning the left edge of a character stem with a left pixel or sub-pixel component boundary and aligning the bottom of the character's base along a pixel component or sub-component boundary. Experimental results have shown that in the case of vertical striping, characters with stems aligned so that the character stem has a blue or green left edge generally tend to be more legible than characters with stems aligned to have a red left edge. Accordingly, in at least some embodiments, when hinting characters to be displayed on a screen with vertical striping, blue or green left edges for stems are favored over red left edges as part of the hinting process. In the case of horizontal striping, characters aligned so that the bottom of the character base has a red or blue bottom edge generally tend to be more legible than characters with bases aligned to have a green bottom edge. Accordingly, when hinting characters to be displayed on a screen with horizontal striping, in at least some embodiments, red or blue bottom edges are favored over green bottom edges as part of the hinting process.

Figure 10:
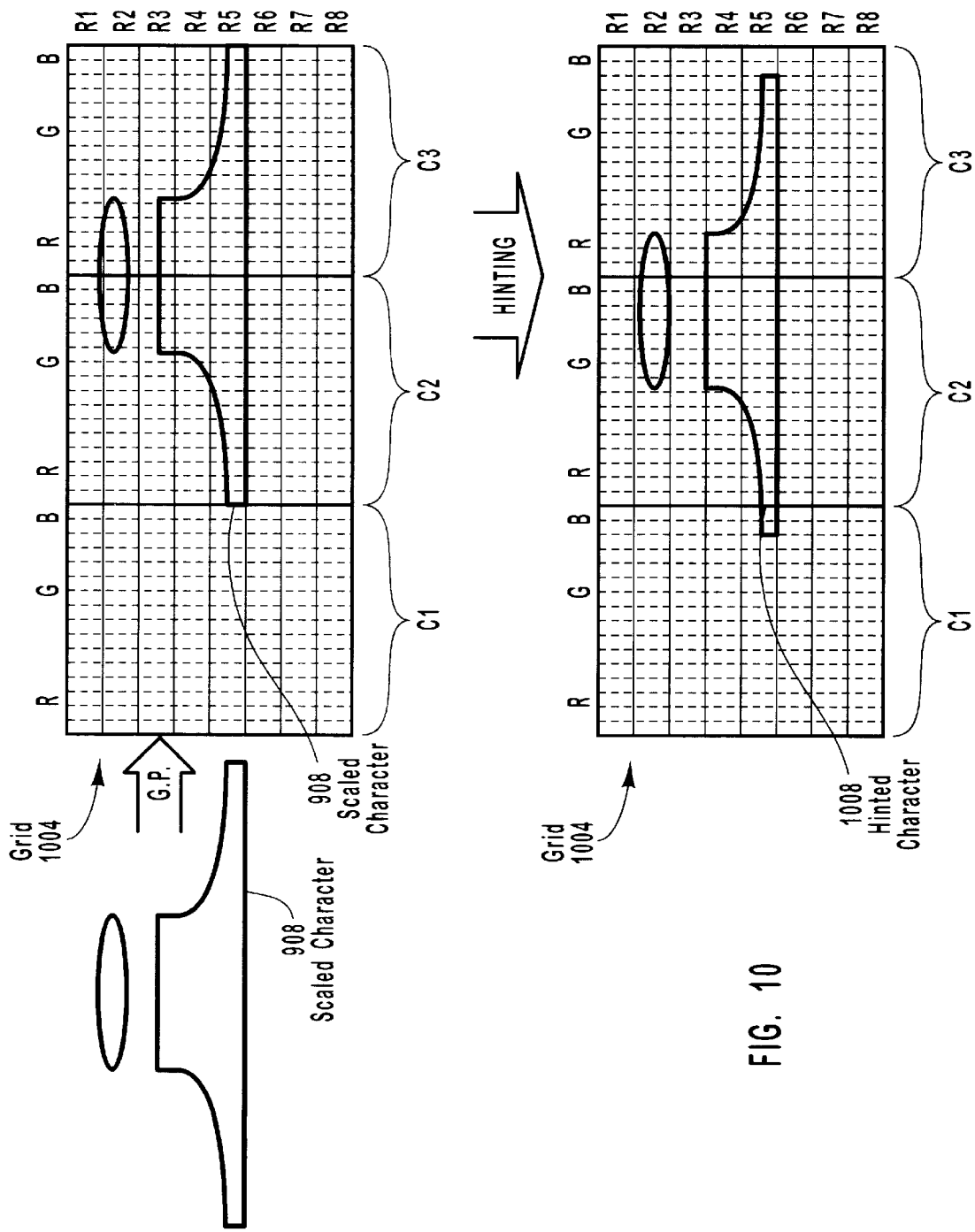
FIG. 10 illustrates an example of a character hinting operation.

An example which illustrates the operation of the hinting process 808 (which may also be referred to as "grid-fitting") is provided in FIG. 10. More specifically, FIG. 10 illustrates the hinting of the scaled character "i" 1008 which is to be displayed on a monitor with vertical striping. As part of the hinting process 808, the scaled image 1008 is placed on a grid 1004 and its position and outline are adjusted to better conform to the grid shape and to achieve a desired degree of character spacing. The letters "G.P." in FIG. 10 denote the grid placement step while the term "hinting" denotes the outline adjustment and character spacing portions of the hinting process.

Once the hinting process 808 is completed, or if the hinting process 808 is not to be performed, once the scaling process 806 is complete, a scan conversion process 812 is performed. The scan conversion process is described in § 4.1.2.1.1.3 below. The intervening source pixel access process 810, to which the present invention is drawn, is described later in §§ 4.2, 4.3, and 4.4.

§ 4.1.2.1.1.3 SCAN CONVERSION

Basically, the scan conversion process 812 converts the scaled geometry representing a character into a bitmap image. Conventional scan conversion operations treat pixels as individual units into which a corresponding portion of the scaled image can be mapped. Accordingly, in conventional scan conversion operations, the same portion of an image is used to determine the luminous intensity values to be used with each of the RGB pixel sub-components of a pixel element into which a portion of the scaled image is mapped. Recall that FIG. 3 illustrates an example of a known scan conversion process which involves sampling an image to be represented as a bitmap and generating luminous intensity values from the sampled values.

In the scan conversion process 812 of the text enhancement system, the RGB pixel sub-components of a pixel are treated as independent luminous intensity elements. Accordingly, each pixel sub-component is treated as a separate luminous intensity component into which a different portion of the scaled image can be mapped. By allowing different portions of a scaled image to be mapped into different pixel sub-components, a higher degree of resolution than with the known scan conversion techniques is provided. Stated in another way, different portions of the scaled image are used to independently determine the luminous intensity values to be used with each pixel sub-component.

Recall that FIG. 6 illustrates an exemplary scan conversion process 812 which may be used in the text enhancement system. In the illustrated embodiment, different image samples 622, 623, 624 of the image segmented by the grid 620 are used to generate the red, green and blue intensity values associated with corresponding portions 632, 633, 634 of the bitmap image 630 being generated. Recall that in the example illustrated in FIG. 6, image samples for red and blue are displaced $-\frac{1}{3}$ and $+\frac{1}{3}$ of a pixel width in distance from the green sample, respectively.

The scan conversion processes 812 generates red, green and blue (R, G, B) luminance intensity values for each pixel sub-component. These values may be expressed in the form of separate, red, green and blue luminance intensity levels. In an unweighted scan conversion operation, the R, C, B luminance intensity levels will usually be either 0 or 1. In a weighted scan conversion operation, more than two (2) luminance intensity levels are normally supported for one or more of the R, G and B pixel sub-components.

In many systems, R, G and B luminance intensity values are specified, stored and processed as three (3) discrete quantities, each having a number of bits corresponding to the number used to specify pixel sub-component luminance intensity values to the display adapter 548 and/or display device 547. For example, many systems use 8-bit quantities, each representing an R, G, or B luminance intensity value. In such an implementation, the processing of R, G, B luminous intensity values requires the storage, processing and transfer of 24 bits per pixel.

In the some devices (such as portable computers and hand held computing devices for example) where memory, processing, and even bus bandwidth are limited resources, using eight (8) bits to represent each R, G, B luminance intensity value throughout the entire rendering process can significantly burden the available resources. To reduce the resources, including memory, required to process and store glyphs, separate R, G, and B luminous intensity level values may be converted, e.g., compressed, into a single number. This number is referred to herein as a "packed pixel value" because it represents the packing of the R, G, and B luminous intensity values associated, with a pixel, into a single value. The range of numbers, e.g., range of packed pixel values, used to represent pixel R, G, B luminous intensity levels, is selected to be large enough so that each possible R, G, B luminous intensity level combination can be uniquely identified. Thus, the total number of packed pixel values, used to represent R, G, B luminous intensity level combinations, should be at least as large as the product of the total number of supported red intensity levels, the total number of supported green intensity levels, and the total number of supported blue intensity levels. Since it is often convenient to work with bytes, i.e., 8-bit quantities, in terms of memory access, processing, and data transfer operations, the product should be able to be specified as an 8-bit quantity or a multiple thereof. In hand held computing devices, a single eight (8) bit per pixel representation of the three R, G, B luminance intensity value product is particularly desirable because of the significant savings in terms of memory, etc. (as compared to embodiments which use eight (8) bits per pixel sub-component luminous intensity value requiring a total of 24 bits per pixel).

To limit the resource burden associated with rendering images generally, and text images in particular, the scan conversion process 812 may convert separate R, G, and B luminous intensity values associated with a pixel into a packed pixel value. In such an embodiment, glyphs are represented, and stored using packed pixel values as opposed to, e.g., three separate 8-bit R, G, and B luminous intensity values. The packed pixel value representations may be converted into separate R, G, and B luminance values of the form used by the display device 547 before the luminous intensity values are supplied to the display adapter 548.

Converting separate R, G, and B luminous intensity levels into packed pixel values may be performed as part of the scan conversion process 812. A shift operation or arithmetic equation may be used to convert between separate R, G, B luminance intensity levels associated with a pixel and a packed pixel value. Such an operation will can produce a total of N (0 through N-1) distinct packed pixel value entries, where N is the total number of possible R, G, and B luminous intensity level combinations that may be assigned to a pixel element. A corresponding R, G, and B luminous intensity level combination is associated with each packed pixel value. The R luminous intensity values vary from 0 to RP-1 where RP is the maximum possible number of red luminous intensity levels. The G luminous intensity values vary from 0 to GP-1 where GP is the maximum possible number of green luminous intensity levels. The B luminous intensity values vary from 0 to BP-1 where BP is the maximum possible number of blue luminous intensity levels. Alternatively, packed pixel values may be converted into R, G, B luminous intensity values using a look-up table by using the packed pixel value as an index into the look-up table and outputting the individual R, G, and B luminous intensity level entries associated with the packed pixel value.

In one exemplary scan conversion process 812, where over sampling in the direction perpendicular to the RGB striping by a factor of sixteen (16) is supported, six (6) red luminous intensity levels are used, e.g., levels 0–5, ten (10) green luminous intensity levels are used, e.g., levels 0–9, and three (3) blue luminous intensity levels are used, e.g., levels 0–2. This results in a total of 180 (=6×10×3) possible R, G, and B luminous intensity level combinations. In such an embodiment N would equal 180 and the look-up table would include packed pixel values 0–179.

Note that the number of supported R, G, and B luminous intensity levels is usually a function of the number of segments used to determine the R, G, and B luminous intensity levels during the scan conversion process 812. Note also that in the exemplary embodiment where 180 possible R, G, B luminance intensity level combinations are supported, each of the packed pixel values 0–179 can be represented using an 8-bit quantity. This significantly lowers storage requirements as compared to embodiments were separate 8-bit values are used for a total of 24 bits per R, G, B combination.

Figure 11:
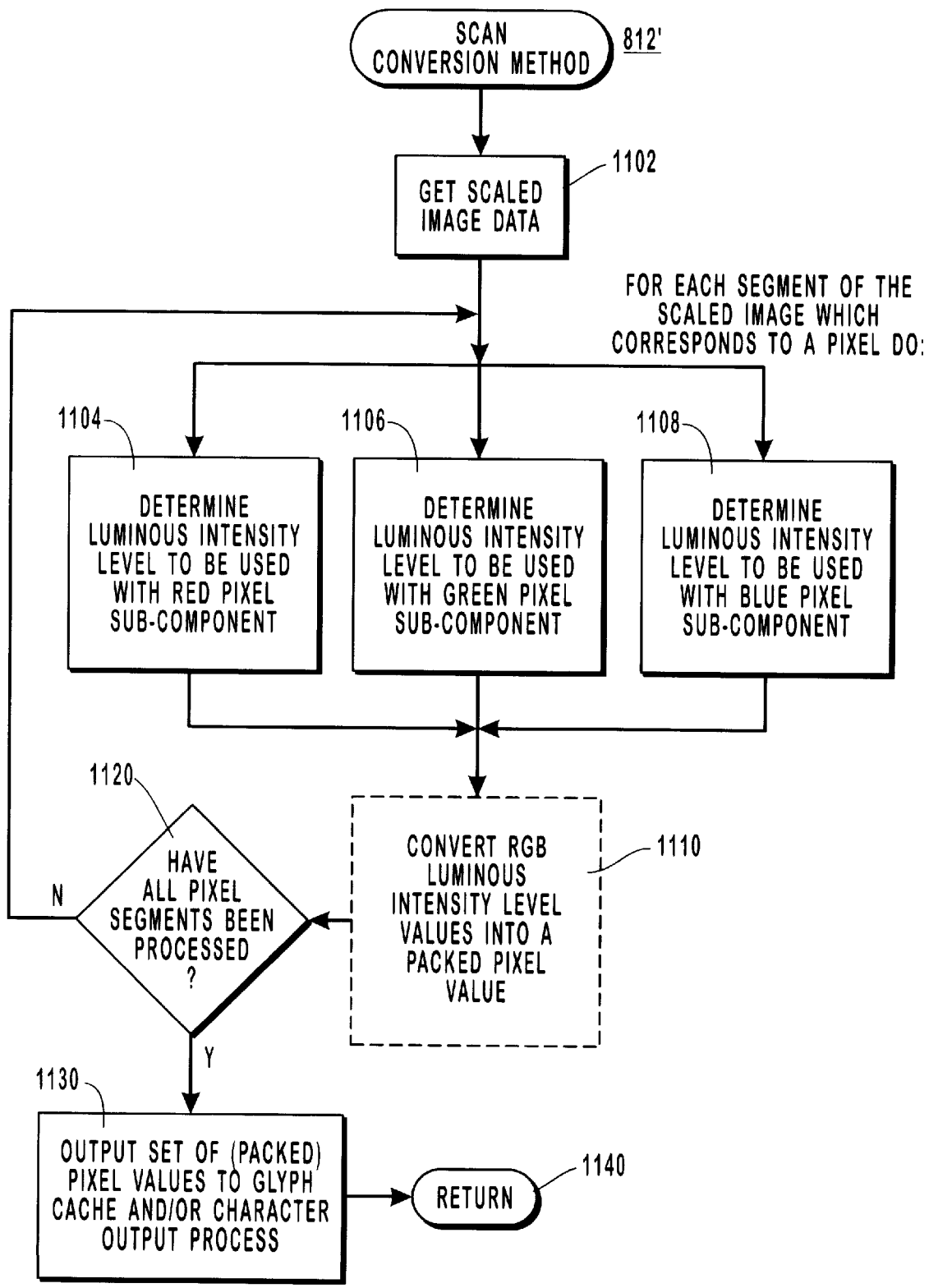
FIG. 11 illustrates an exemplary method for performing a character scan conversion process.

FIG. 11 illustrates an exemplary scan conversion method 812'. At step 1102, scaled (and optionally hinted) image data is accepted. The scaled image data normally includes image data relating to multiple pixels. The scaled image data corresponding to each pixel is processed separately by luminance level determination steps for the red pixel sub-component 1104, the green pixel sub-component 1106, and the blue pixel sub-component 1108. More specifically, in step 1104, the luminous intensity level to be used with the red pixel sub-component, corresponding to the pixel segment being processed, is determined. This step 1104 may be performed by determining the number of red pixel sub-component segments to be turned "on" by examining the scaled image. In step 1106, the luminous intensity level to be used with the green pixel sub-component, corresponding to the pixel segment being processed, is determined. This step 1106 may be performed by determining the number of green pixel sub-component segments to be turned "on" by examining the scaled image. Finally, in step 1108, the luminous intensity level to be used with the blue pixel sub-component, corresponding to the pixel segment being processed, is determined. This step 1108 may be performed by determining the number of blue pixel sub-component segments which are to be turned "on" by examining the scaled image. Although steps 1104, 1106 and 1108 are shown as being performed in parallel, they may be performed sequentially.

Once a set of R, G, and B luminous intensity level values for the R, G, B pixel sub-components of the pixel element corresponding to the pixel segment being processed are determined, the method 812' proceeds to optional step 1110. In optional step 1110, the set of R, G, B luminous intensity values are converted into a packed pixel value. Recall that this step may be performed using a look-up table or a conversion function.

Then, in step 1120, it is determined whether or not all the pixel segments of the scaled (and optionally hinted) image have been processed. If data corresponding to scaled image segments remains to be processed, the method 812' branches back to steps 1104, 1106, and 1108 so that the scaled image data corresponding to the next pixel segment can be processed. If, on the other hand, it is determined that all of the pixel segments of the scaled (and optionally hinted) image have been processed, the method 812' branches to step 1130.

Step 1130 outputs the set of generated packed pixel values, which represent a glyph, to the glyph cache 726 and/or the character output process 730. The scan conversion method 812' is then left via RETURN node 1140.

Figure 12:
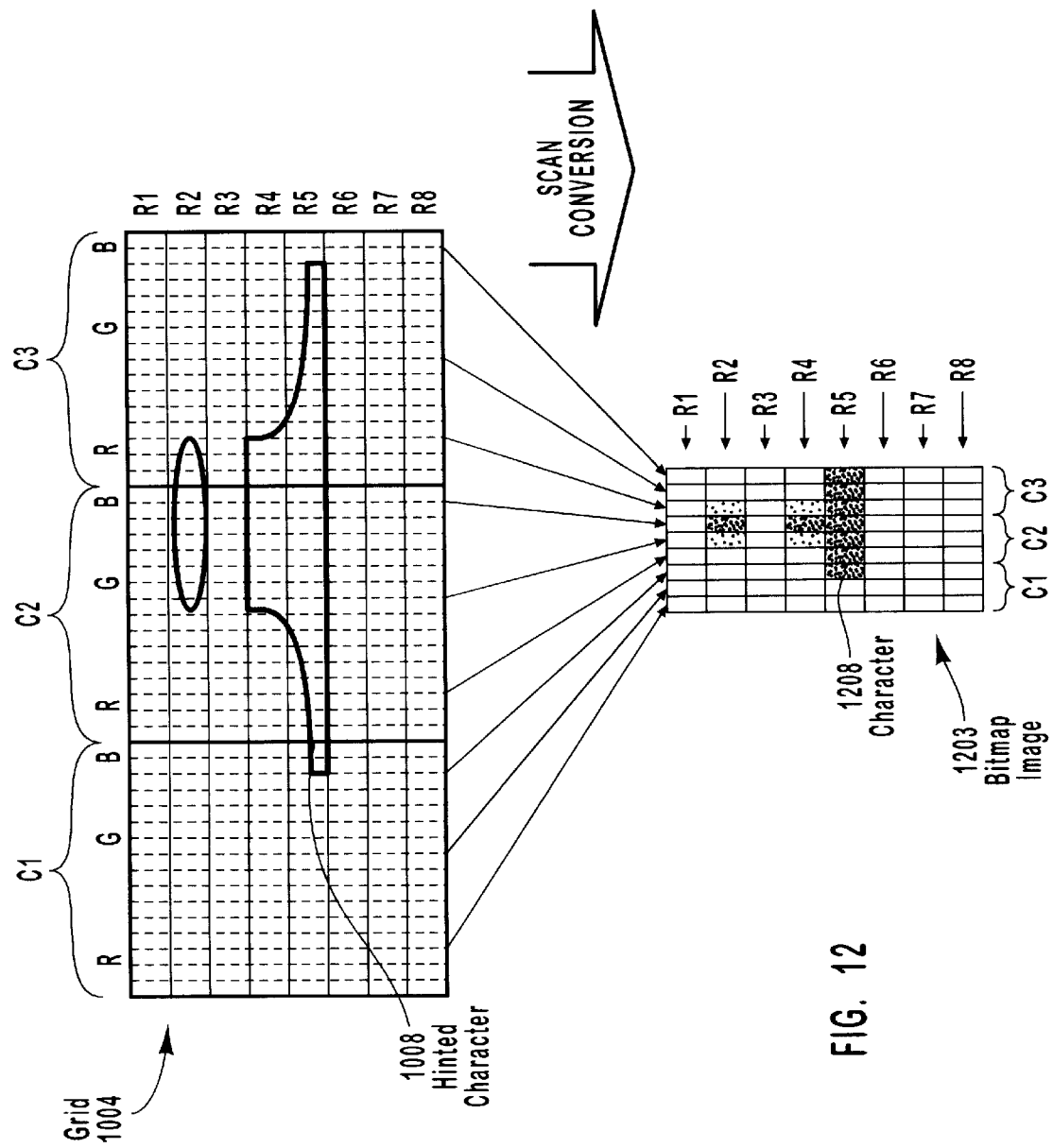
FIG. 12 illustrates a scan conversion operation on an oversampled character bitmap.

FIG. 12 illustrates a weighted scan conversion operation performed on the hinted image 1008 for display on a display device with horizontal striping. In the example illustrated in FIG. 12, white is used to indicate pixel sub-components which are "turned off" in the bitmap image generated by the scan conversion operation. Pixel sub-components which are turned "on", e.g., because they have one or more segments that are at least 50% within a character outline, are indicated using stippling. The denser the stippling, the lower the luminous intensity of the stippled pixel sub-component.

Black text "on" implies that the intensity value associated with the pixel sub-component is controlled so that the pixel sub-component does not output light, or outputs light at the minimum possible luminous intensity. Assuming a white background pixel, sub-components which are not "on" would be assigned intensity values which would cause them to output their full light output. Gradations between full "on" and full "off" are possible when the image is placed on a grid having multiple segments per pixel sub-component. In such a case, a count of the number of segments which should be "on" for a given sub-component is determined. The number of image segments which are "on" is a luminous intensity level value. Such a value indicates the luminous intensity to be used for the corresponding pixel sub-component. Using M segments to represent a pixel sub-component supports M+1 luminous intensity levels, i.e., levels corresponding from 0 "on" segments to M "on" segments.

A first technique for determining if a segment of an image corresponding to a pixel sub-component should be considered as "on" during scaling is to determine if the scaled image segment, represented by a portion of the scaling grid and being mapped into the pixel sub-component, is within the scaled representation of the image to be displayed. Another technique is to determine if 50% or more of the scaled image segment, being mapped into the pixel sub-component, is occupied by the image to be displayed. If it is, then the image segment is considered to be turned "on". Otherwise, the image segment is considered to be turned "off".

When weighting is applied, different sized regions of the scaled image are used to determine whether a particular pixel sub-component should be turned "on", "off" or to a value in between.

The human eye perceives light intensity from different color light sources at different rates. Green contributes approximately 60%, red approximately 30% and blue approximately 10% to the perceived luminance of a white pixel which results from having the red, green and blue pixel sub-components set to their maximum luminous intensity output. Thus, when allocating resources, such as luminous intensity levels for example, more levels may be allocated to green than to blue or red. Similarly, more intensity levels may be allocated to red then to blue. However, in some embodiments, equal numbers of intensity levels are assigned to red, green and blue pixel sub-components.

In the exemplary embodiment illustrated in FIG. 12, as the result of horizontal over sampling (Recall FIG. 9.), sixteen (16) image segments correspond to each pixel element. Thus, in FIG. 12 a pixel segment comprises sixteen (16) image segments. Of the sixteen (16) image segments associated with a pixel element, five (5) are allocated as corresponding to the red pixel sub-component (referred to herein as "red image segments"), nine (9) pixel segments are allocated to the green pixel sub-component (referred to herein as "green image segments"), and the remaining two (2), out of the sixteen (16) image segments, are allocated to the blue pixel sub-component (referred to herein as "blue image segments"). This allocation of segments supports six (6) red, ten (10) green and three (3) blue pixel sub-components intensity levels.

Other image segment allocations are possible and, in some embodiments, the same number, of segments, such as two (2) or three (3) segments for example, are allocated per pixel sub-component.

In the scan conversion example of FIG. 12, a pixel segment is considered "on" if it is at least 50% within the image's outline. The scan conversion operation illustrated in FIG. 12 results in the bitmap image 1203 which, in accordance with the present invention, is stored as a set of packed pixel values. Note how each pixel sub-component of bitmap image columns C1–C3 is determined from a different set of sixteen (16) image segments. Note also how the intensity of individual pixel sub-components varies depending on the number of "on" segments corresponding to the individual red, green and blue pixel sub-components.

Figure 13:
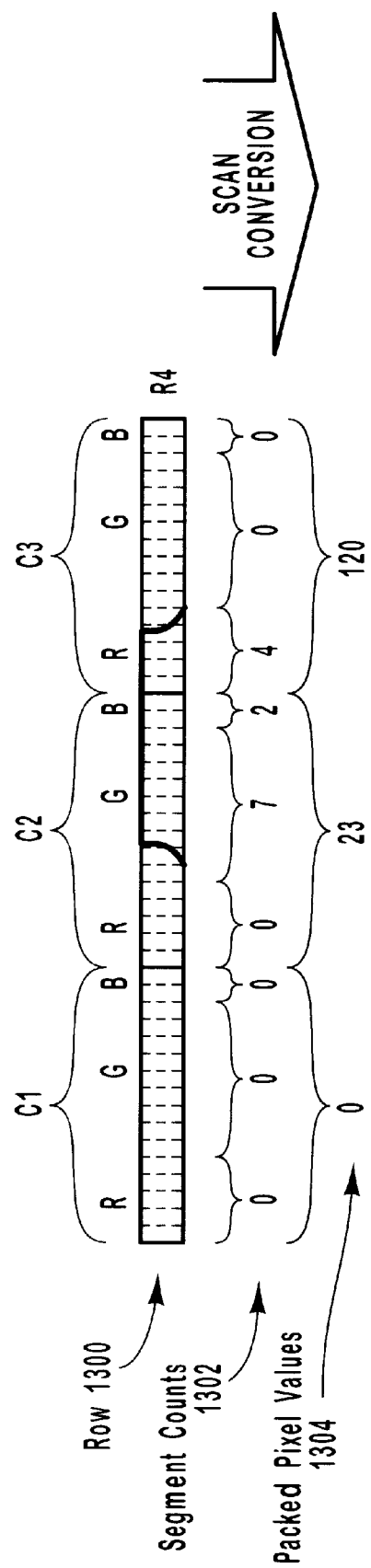
FIG. 13 illustrates a scan conversion operation on one row of an oversampled character bitmap.

FIG. 13 illustrates, in greater detail, the result of performing a weighted scan conversion operation on the fourth row 1300 R4 of the scaled hinted image 1018. In FIG. 13, the R, G, B pixel segment counts for each of the R, G, B pixel sub-components are shown in row 1302 directly beneath the corresponding pixel sub-component. (Recall steps 1104, 1106, and 1108 the scan conversion method 812'.)

The image of the character being rendered does not pass through the segments corresponding to pixel (C1, R4). Accordingly, none of the segments associated with this pixel element are "on" and all of the R, G, and B sub-pixel segment counts are zero (0) for this pixel resulting in R, G, and B values of (0,0,0). For pixel element (C2, R4) the luminance intensity levels obtained by performing scan conversion steps 1104, 1106, and 1108 on the scaled image are (0, 7, 2) since there are zero (0) red pixel sub-component segments within the outline of the image, seven (7) green pixel sub-component segments that are at least 50% within the outline of the image, and two (2) blue pixel sub-component segments that are at least 50% within the outline of the image. Finally, for pixel element (C3, R4) the luminance intensity levels obtained by performing a scan conversion operation on the scaled image are (4, 0, 0) since there are four (4) red pixel sub-component segments that are at least 50% within the outline of the image, zero (0) green pixel sub-component segments that are at least 50% within the outline of the image, and zero (0) blue pixel sub-component segments that are at least 50% within the outline of the image.

The R, G, B luminous intensity pixel sub-component values (0,0,0) (0, 7, 2), and (4, 0, 0) are converted in scan conversion sub-routine step 862 into packed pixel values 0, 23, and 120, respectively, when using an exemplary pixel packing formula of:

packed pixel=(10×R+G)×3+B.

Row 1304 illustrates the packed pixel values generated for each pixel element (C1, R4) (C2, R4) (C3, R4).

Having described an exemplary text enhancement system in which the present invention may operate, functions of the present invention are introduced in § 4.2. Then exemplary processes, data structures and methods for performing various aspects of the present invention are disclosed in § 4.3. Finally, examples illustrating the operation of various aspects of the present invention are disclosed in § 4.4.

§ 4.2 FUNCTIONS OF THE PRESENT INVENTION

Figure 14:
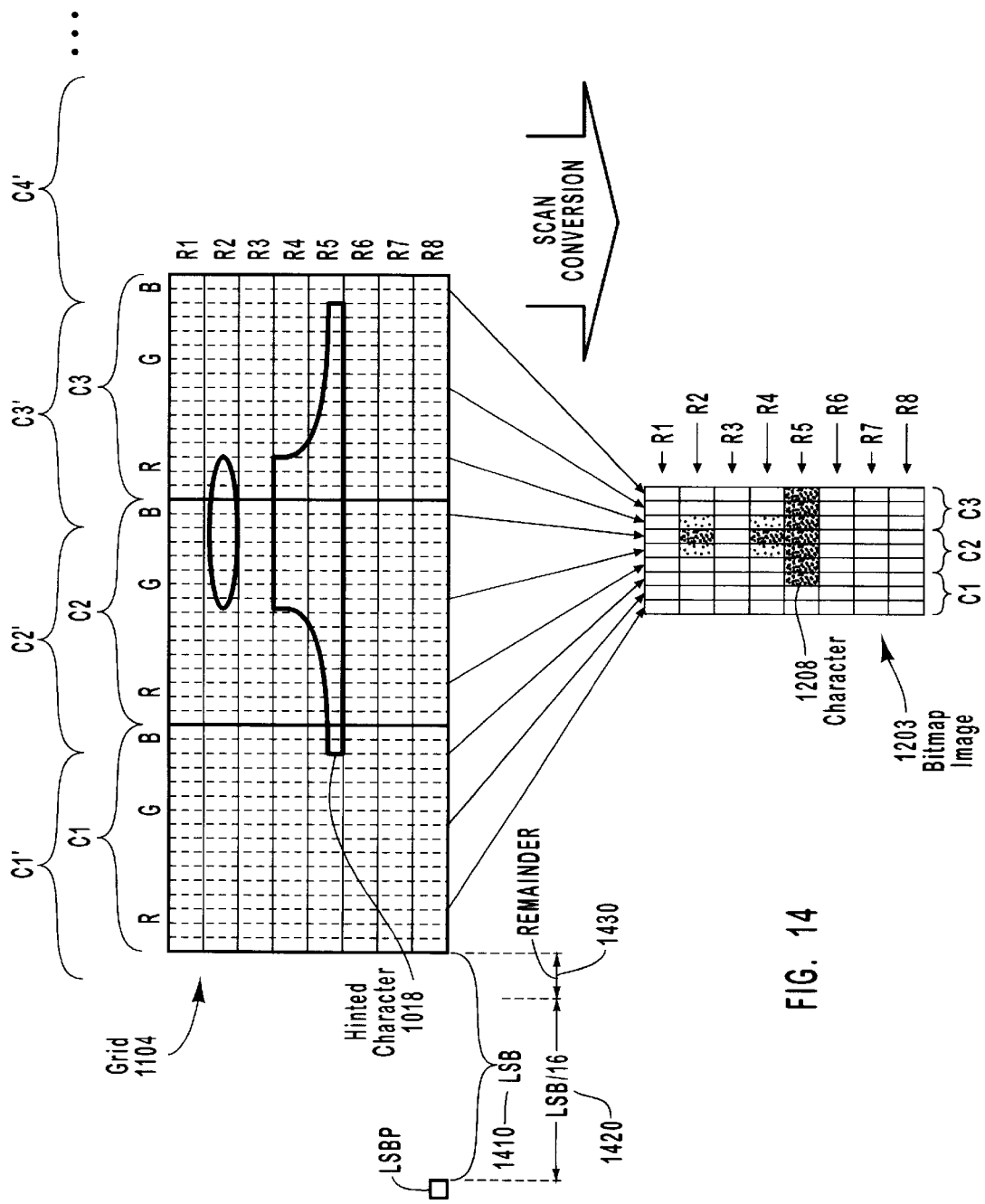
FIG. 14 illustrates a scan conversion operation on an oversampled character bitmap, where left side bearing information is provided.
Figure 15:
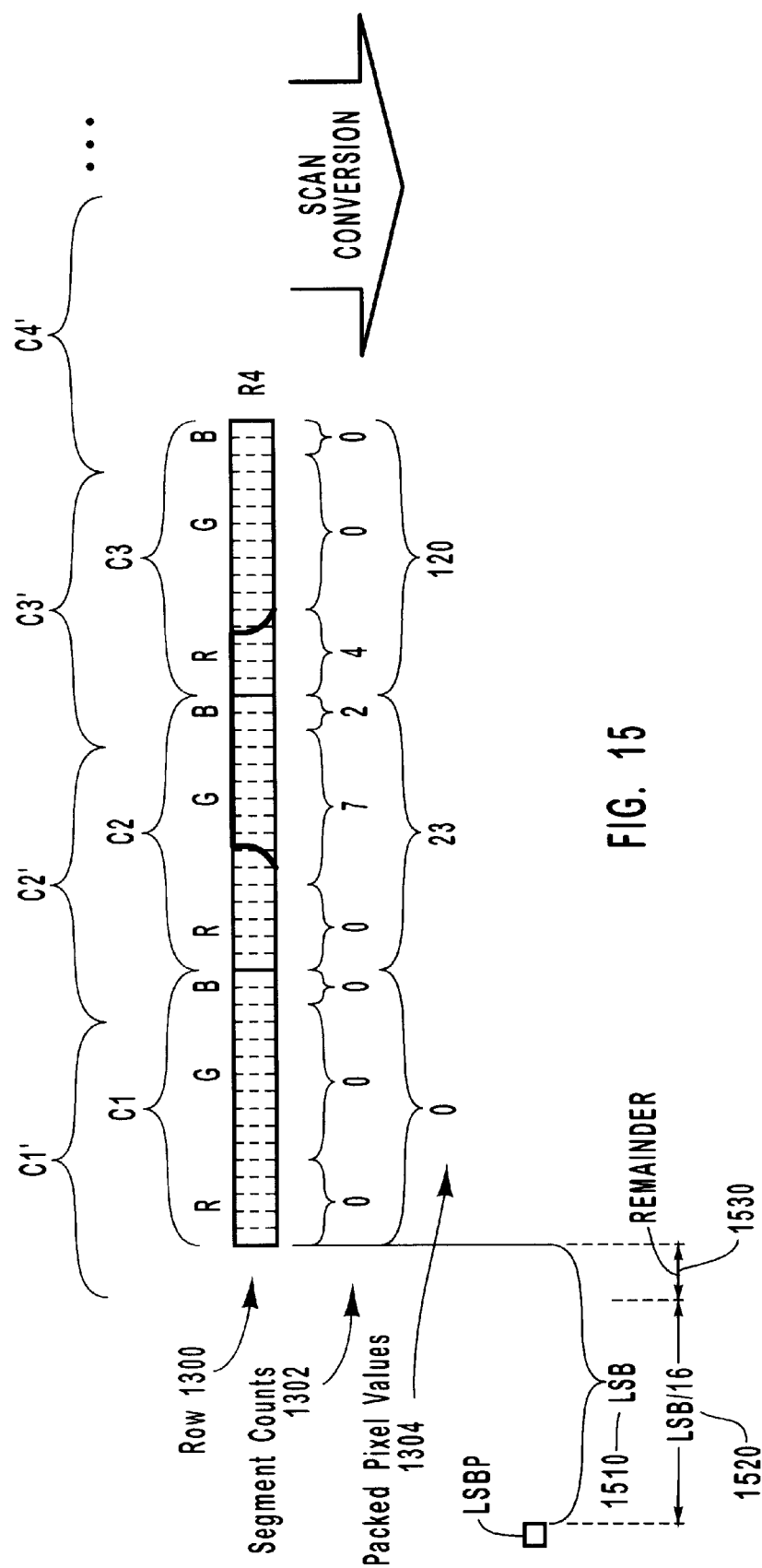
FIG. 15 illustrates a scan conversion operation on one row of an oversampled character bitmap, where left side bearing information is provided.

Referring to both FIGS. 14 and 15, recall from § 4.1.2.1.1.1 above that when scaling the left side bearing 410 value, the scaled left side bearing value 1410, 1510 might have a portion which corresponds to an integer multiple 1420, 1520 of a pixel size unit (such as sixteen (16) for example) and a remainder 1430, 1530 which is smaller than a pixel size unit. Notice that the left side bearing remainder 1430, 1530 shifts the pixel boundaries such that column C1 becomes column C1', column C2 becomes column C2', and column C3 becomes column C3'. Notice also that an additional column, column C4, is added. Hence, when accessing the oversampled sub-pixels, also referred to as "source sub-pixels", the blocks of source sub-pixels to be accessed should be shifted so that the left side bearing remainder 1430, 1530 is accounted for in the final display of the character.

It is desirable to access the source sub-pixels in blocks (or chunks) corresponding to the over-sampling rate—in this example, blocks of sixteen (16) source sub-pixels. Even though, in the example shown, the blocks of sixteen source sub-pixels originally correspond to byte boundaries, when the left side bearing remainder 1430, 1530 is added, the blocks or chunks of desired source sub-pixels may begin anywhere within a byte and may span byte boundaries. Thus, a function of the present invention is to provide a way to quickly access the desired blocks of source sub-pixels.

§ 4.3 EXEMPLARY PROCESSES, METHODS, AND DATA STRUCTURES

Recall that in the example described with reference to FIGS. 9, 10, and 12 through 15, the oversampling "rate" in the horizontal (or X) direction was sixteen (16). In such an embodiment, the present invention functions to access blocks or chunks of sixteen (16) source sub-pixels. An exemplary method for performing the process 810 when the oversampling "rate" is sixteen (16) in the horizontal (or X) direction is disclosed in § 4.3.1 below. A general method, for performing the process 810 when the oversampling "rate" in the horizontal (or X) direction is between and including 2 and 24 is disclosed in § 4.3.2 below.

§ 4.3.1 FIRST EXEMPLARY METHOD (N=16)

Figure 16:
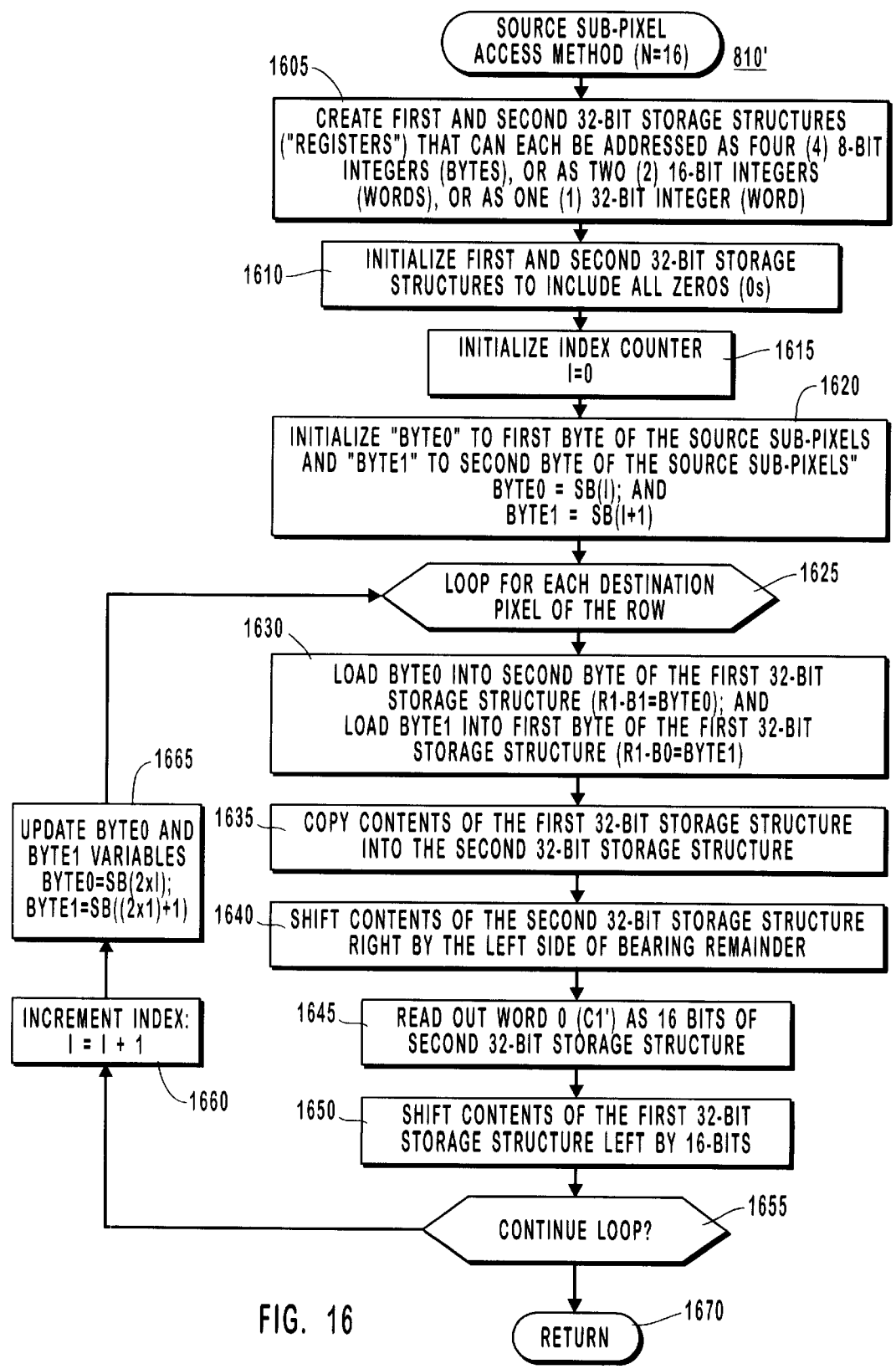
FIG. 16 is a flow diagram of an exemplary method for performing a source pixel access process of the present invention.

FIG. 16 is a flow diagram of an exemplary method 810' for performing the source sub-pixel access process 810. To reiterate, this method may be used when the oversampling rate in the horizontal (or X) direction is sixteen (16). As shown in step 1605, first and second 32-bit storage structures (also referred to as "registers" without loss of generality) are created. Each of these 32-bit storage structures may be addressed as four (4) 8-bit integers (or bytes), two (2) 16-bit integers (or words), or one (1) 32-bit integer (or word). As shown in step 1610, these 32-bit storage structures are initialized to include all zeros (0s). Step 1615 initializes an index counter I to zero (0). Finally, step 1620 initializes an 8-bit variable "BYTE0" to a first byte of the source sub-pixels (SP0) and initializes an 8-bit variable "BYTE1" to a second byte of the source sub-pixels (SP1).

Steps 1625 and 1655 define a loop through all destination pixels—namely, pixels which result from the scan conversion operation. Note that if there were no left side bearing remainder considered, the number of destination pixels would merely be the number of source sub-pixels in a row divided by the oversampling rate (in this case, sixteen (16)), the result being rounded up to the nearest integer. However, since the left side bearing remainder is considered, the number of destination pixels may be determined as the sum of the number of source sub-pixels in a row and the left side bearing remainder, divided by the oversampling rate (in this case, sixteen (16)), the result being rounded up to the nearest integer.

Within the loop defined by steps 1625 and 1655, a number of steps are performed. More specifically, as shown in step 1630, the BYTE0 is loaded into the second byte (R1, BYTE 1) of the first 32-bit storage structure and BYTE1 is loaded into the first byte (R1, BYTE 0) of the first 32-bit storage structure. Next, as shown in step 1635, the contents of the first 32-bit storage structure are copied to the second 32-bit storage structure. Then as shown in step 1640, the contents of the second 32-bit storage structure are shifted right by the left side bearing remainder. (Note that there is no wrap around when bits are shifted out of the storage structures.) Next, as shown in step 1645, the first 16-bit chunk of source sub-pixels to be used by a scan conversion process 812 to determine a first destination pixel is read out as sixteen (16) bits from the second 32-bit storage structure. Finally, as shown in step 1650, the contents of the first 32-bit storage structure are shifted left by sixteen (16) bits (again with no wrap around). If there are more destination pixels to be processed in the row by the scan conversion process 812, the loop continues from step 1655 to step 1660 where the index counter I is incremented, step 1665 where the 8-bit BYTE0 and BYTE1 variables are updated to the next two bytes of the source sub-pixels, and back to step 1625. Otherwise, the process 810' is left via RETURN node 1695.

Note that the method 810' shown accesses only one (1) row of source sub-pixels which are used by the scan conversion process 812 to generate one row of destination pixels to define one row of a glyph. Naturally, this method 810' could be modified, or made part of a larger method, to loop through and access all rows of source sub-pixels for use by the scan conversion process 812 to generate all rows of destination pixels to define an entire glyph.

Having described a method 810' for accessing source sub-pixels when the oversampling rate is sixteen (16) in the horizontal (or X) direction, another more general exemplary method for accessing source sub-pixels for oversampling rates between and including 2 and 24 is described in § 4.3.2 below.

§ 4.3.2 SECOND EXEMPLARY METHOD (1<N=<24)

Figure 17:
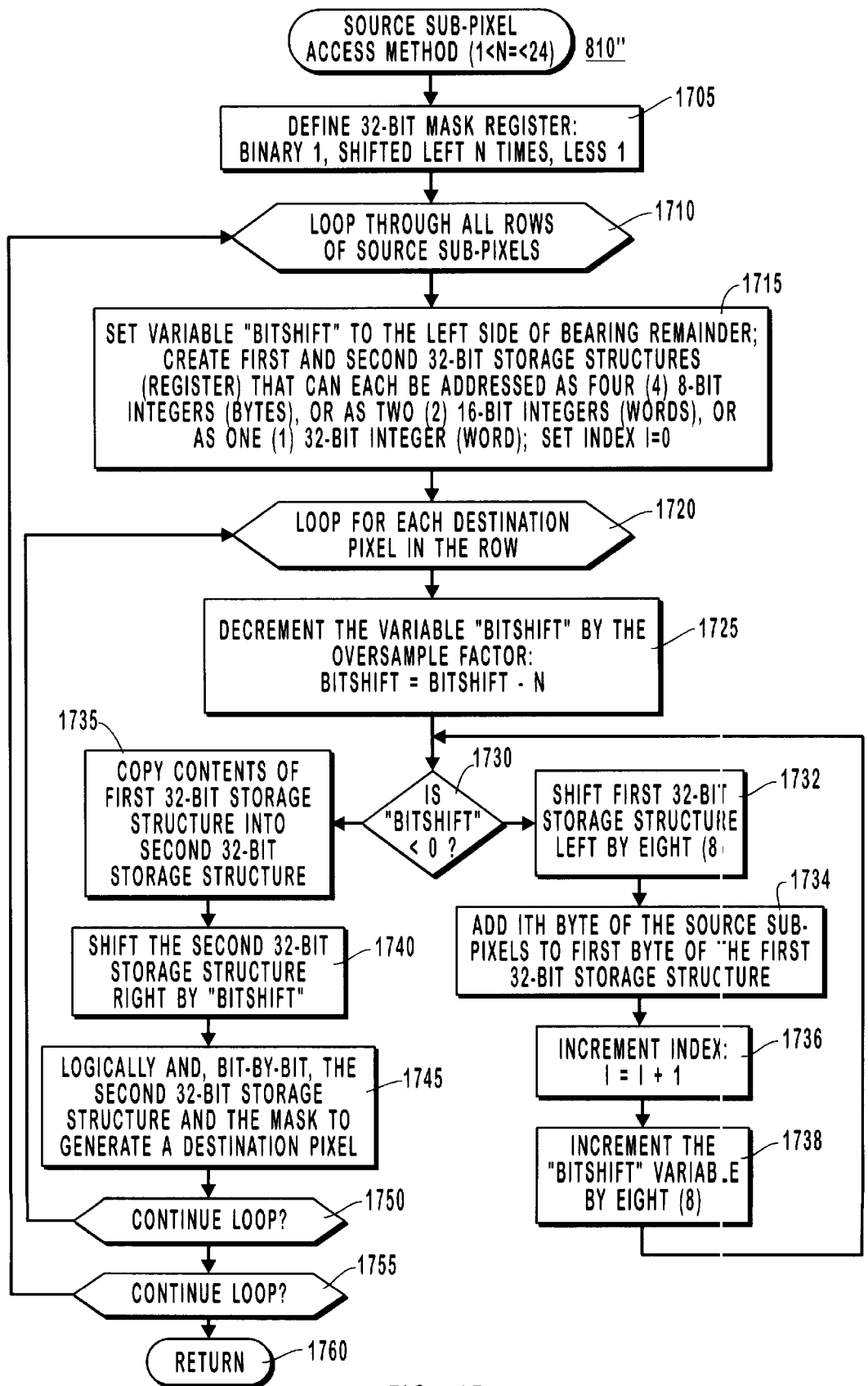
FIG. 17 is a flow diagram of another exemplary method for performing a source pixel access process of the present invention.

FIG. 17 is a flow diagram of an exemplary method 810'' for accessing source sub-pixels in chunks of between, and including, 2 and 24 bits. First, as shown in step 1705, a 32-bit mask storage structure (also referred to as a "register" without loss of generality), having N 1s in the least significant bits is defined. Such a 32-bit mask register may be defined, for example, by loading the 32-bit storage structure with a binary 1, shifting it left N times, and subtracting 1.

Steps 1710 and 1755 define a loop through all rows of the source sub-pixels. Within the loop defined by steps 1710 and 1755, a variable "BITSHIFT" is set to the left side bearing remainder, first and second 32-bit storage structures are defined and each is initialized to zero (0), and a count index I is initialized to zero (0).

Steps 1720 and 1750 define a loop through each destination pixel in the current row—namely, pixels which result from the scan conversion operation. Recall that if there were no left side bearing remainder considered, the number of destination pixels would merely be the number of source sub-pixels in a row divided by the oversampling rate (N), the result being rounded up to the nearest integer. However, since the left side bearing remainder is considered, the number of destination pixels may be determined as the sum of the number of source sub-pixels in a row and the left side bearing remainder, divided by the oversampling rate (N), the result being rounded up to the nearest integer. Within the loop defined by steps 1720 and 1750, the variable "BITSHIFT" is decremented by the oversample factor (N) as shown in step 1725. Processing then proceeds to decision step 1730.

At decision step 1730, it is determined whether or not the variable "BITSHIFT" is less than zero (0). If so, processing branches to step 1732 where the contents of the first 32-bit storage structure are shifted left by eight (8). Then, the $I^{th}$ byte of the source sub-pixels is added to the first byte (R1, BYTE 0) of the first 32-bit storage structure. The index I is incremented at step 1736 and the "BITSHIFT" variable is incremented by eight (8) in step 1738. Processing then branches back to decision step 1730. The processing which occurs if the "BITSHIFT" variable is less than zero (0) has just been described. If, on the other hand, the "BITSHIFT" variable is not less than zero (0), processing branches to step 1735 where the contents of the first 32-bit storage structure are copied to the second 32-bit storage structure. Then, at step 1740, the second 32-bit storage structure is shifted right by the "BITSHIFT" variable. Then, as shown in step 1745, the contents of the second 32-bit storage structure are logically ANDed, bit-by-bit, with the 32-bit mask to generate a chunk of source sub-pixels to be used by the scan conversion process 812 to generate a destination pixel.

At step 1750, if more destination pixels remain to be processed for the current row, processing branches back to step 1720. Otherwise, processing branches to step 1755. At step 1755, if more rows of the source sub-pixels are to be processed, processing branches back to step 1710. Otherwise, the method is left via RETURN node 1760.

Having described two (2) exemplary methods for performing the source sub-pixel access process 810, resulting data structures are described in § 4.3.3 below and examples which illustrate the operation of these methods are presented in § 4.4 below.

§ 4.3.3 DATA STRUCTURES

Figure 21:
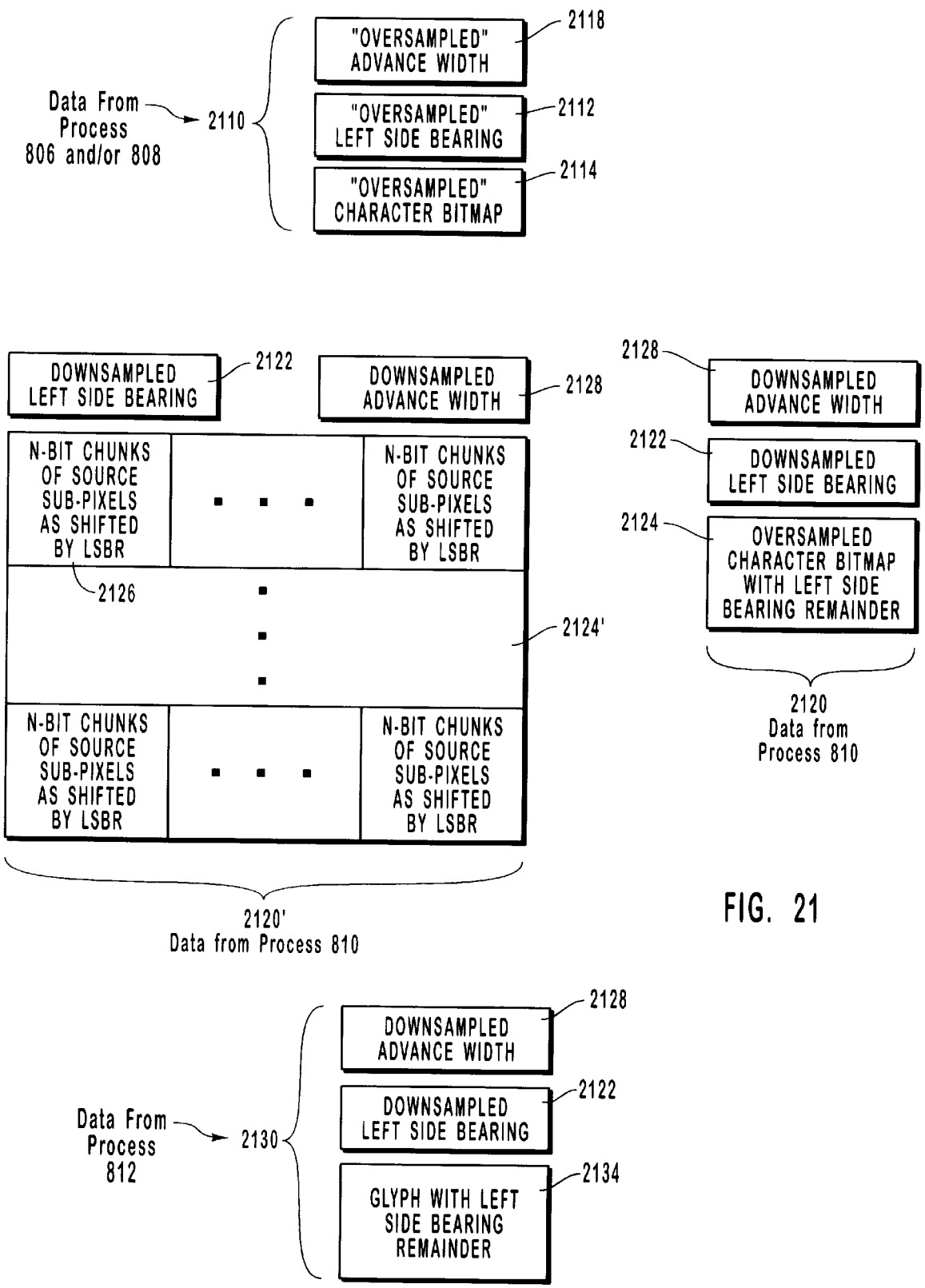
FIG. 21 illustrates exemplary data structures accepted and generated by the source sub-pixel access process of the present invention.

FIG. 21 illustrates data structures accepted and created by the source sub-pixel access process 810 of the present invention. Data 2110 is provided from the scaling process 806 and/or the hinting process 808. Basically, the data 2110 includes an "oversampled" left side bearing 2112, and a bitmap 2114 of an oversampled character. Technically, the left side bearing 2112 is not strictly oversampled, but rather, is determined based on the oversampling rate. That is, the "oversampled" left side bearing 2112 is not necessarily an integer multiple of the oversampling rate.

The source sub-pixel access process 810 generates data 2120, or alternatively, data 2120'. The data 2120 includes downsampled left side bearing data 2122 which is an integer. The data 2120 also includes a bitmap 2124 of oversampled character having a left side bearing remainder. The alternative data 2120' similarly includes downsampled left side bearing data 2122 which is an integer. In this case however, the data structure 2124 includes N-bit "chunks" (where N is the oversampling rate) of source sub-pixels as shifted by the left side bearing remainder. In either case, the scan conversion process 812 may produce data 2130 including a downsampled left side bearing 2122, which is an integer, and a glyph 2134 which includes the left side bearing remainder.

Advance width information, either "oversampled" and downsampled, may also be passed between the processes.

Having described data structures accepted and generated by the source sub-pixel access process, examples which illustrate the operation of the methods disclosed in §§ 4.3.1 and 4.3.2 above are presented in § 4.4 below.

§ 4.4 EXAMPLES OF OPERATIONS

IN THE DRAWINGS

In accordance with 37 C.F.R §1.121(a)(3) Applicant submits herewith substitute sheets of drawings for approval by the Examiner, including revised FIGS. 3, 4, 5A, 6, 9, 10, 12–15, 18A–F, 19A–I, 20A–E and 21. In particular, FIGS. 5A, 6 and 9 have been changed by adding the legend—(Prior Art)—. The other drawings have been changed by adding descriptive textual labels as required by the Examiner, without adding any new subject matter to the application. If the Examiner approves these substitute sheets of drawings, they will be formalized by Applicant.

4.4.1 EXAMPLE ILLUSTRATING THE OPERATION OF THE FIRST EMBODIMENT (N=16)

Figures 18A, 18B, 18C:
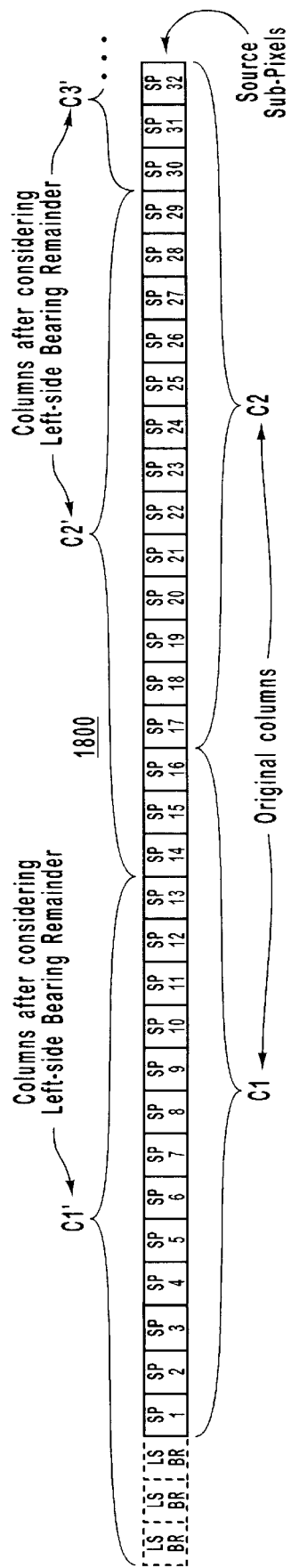

FIGS. 18A through 18F illustrate an example of the operation of the method 810' of FIG. 16 on two (2) columns (C1, C2) (or two (2) 16-bit chunks) of a row of source sub-pixels corresponding to an oversampling rate of sixteen (16). FIG. 18A illustrates source sub-pixels 1800 for two (2) columns (or four (4) bytes) of a row. Since a left side bearing remainder LSBR is to be considered, a scan conversion process 812 will operate on three (3) (C1", C2', C3) columns, (or chunks) of source sub-pixels, rather than just two (2) (C1, C2) columns, or sixteen (16) bit chunks of source sub-pixels.

A first 32-bit storage structure 1810 is initially loaded with all zeros (0s). As shown in FIG. 18B, the first 32-bit storage structure then has the second byte (S, BYTE 1) of the source sub-pixels loaded into its first byte (R1, BYTE 0), and a first byte (S, BYTE 0) of the source sub-pixels loaded into its second byte R1, BYTE 1). (Recall step 1630 of FIG. 16.) Notice that the source sub-pixels are arranged in "big endian" order—that is, the least significant part of a number is at the lower address or bytes are ordered from left to right—, while the first 32-bit storage structure is arranged in "little endian" order—that is, the most significant part of the number is at the higher address or bytes are ordered from right to left.

As shown in FIG. 18C, the contents of the first 32-bit register 1810 are loaded into a second 32-bit register 1820 and these contents are shifted right by the left side bearing remainder. (Recall steps 1635 and 1640 of FIG. 16.) The first sixteen (16) bits (or word W0) of the second 32-bit register 1820 is read out and serves as the source sub-pixels used by the scan conversion process 812 to determine a first destination pixel. (Recall step 1645 of FIG. 16.)

Referring now to both FIGS. 18B and 18D, the contents of the first 32-bit register are shifted left by 16, resulting in the first 32-bit register 1810' shown in FIG. 18D. (Recall step 1650.)

Since there are more destination pixels to be determined by the scan conversion process 812, the process 810' loops and next two (2) bytes (that is S, BYTE 2 and S, BYTE 3) are loaded into the second and first bytes (R1, BYTE 1 and R1, BYTE 0) of the first 32-bit register 1810" as shown in FIG. 18E. (Recall step 1630 of FIG. 16.)

Then, the contents of the first 32-bit register 1810" are copied into the second 32-bit register 1820 and shifted right by the left side bearing remainder. The resulting contents of the second 32-bit register 1820' are shown in FIG. 18F. (Recall steps 1635 and 1640 of FIG. 16.) The first sixteen (16) bits of the second 32-bit register 1820' is read out and serves as the source sub-pixels used by the scan conversion process 812 to determine a second destination pixel. (Recall step 1645 of FIG. 16.) Although not illustrated, the process 810' loops to continue accessing subsequent source sub-pixels.

§ 4.4.2 EXAMPLE ILLUSTRATING THE OPERATION OF THE SECOND EMBODIMENT WHERE OVERSAMPLE RATE IS GREATER THAN 16

Figures 19E, 19F, 19G, 19H, 19I:
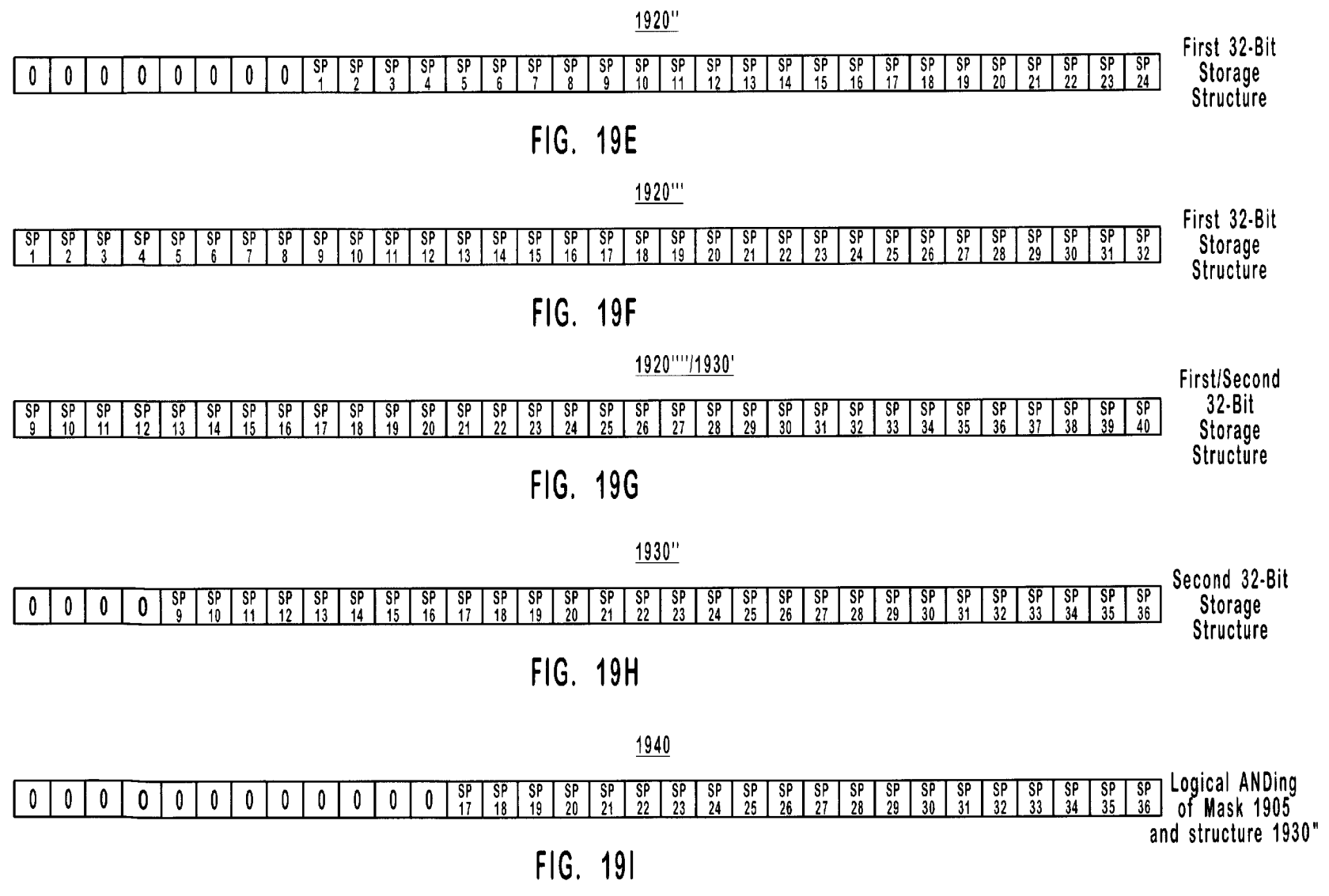

FIGS. 19A through 19I illustrate an example of the operation of the method 810" of FIG. 17 on two (2) columns (C1, C2) of a row of source sub-pixels corresponding to an oversampling rate of twenty (20), where the left side bearing remainder is four (4). FIG. 19A illustrates the 32-bit mask 1905 generated in step 1705. FIG. 19B illustrates the source sub-pixels 1910 and the affect of the left side bearing remainder on the chunks of twenty (20) source sub-pixels used by the scan conversion process 812 to derive the destination pixels. At step 1715, the "BITSHIFT" variable is set to four (4) and then changed to −16 (=4−20) at step 1725. Since the "BITSHIFT" variable is less than zero (0), the first 32-bit storage structure is shifted right by eight (8) and byte 0 of the source sub-pixels are added to the first 32-bit storage structure 1920 as shown in FIG. 19C. (Recall steps 1732 and 1734 of FIG. 17.) The index count I is incremented to one (1) and the "BITSHIFT" variable is changed to −8 (=−16+8) (Recall steps 1736 and 1738.). Since the "BITSHIFT" variable is still less than zero (0), the first 32-bit storage structure is again shifted left by eight (8) and byte 1 of the storage sub-pixels are read into the first 32-bit storage structure. (Recall, steps 1730, 1732, and 1734). The contents of the first 32-bit storage structure 1920' are shown in FIG. 19D. The index count I is then incremented to two (2) and the "BITSHIFT" variable is changed to 0 (=−8+8) (Recall steps 1736 and 1738.). Since the "BITSHIFT" variable is not less than zero (0), the contents of the first 32-bit storage structure are copied to the second 32-bit storage structure, the second storage structure is rotated right by "BITSHIFT" bits (Since "BITSHIFT" is zero (0), no right shift actually occurs.) (Recall steps 1735 and 1740.). The resulting second 32-bit storage structure 1930 is shown in FIG. 19D. The first chunk of source sub-pixels is determined by logically ANDing, bit-by-bit, the mask 1905 with the contents of the second 32-bit storage structure 1930. Notice that the result of this operation corresponds to C1' of FIG. 19B.

For the next destination pixel, the "BITSHIFT" variable is set to −20 (=0−20). (Recall steps 1750, 1720, and 1725.) The first 32-bit storage structure is shifted left by eight (8), byte 2 of the source sub-pixels is added to the first 32-bit storage structure, the index I is incremented to three (3), and the BITSHIFT variable is incremented by eight (8) to −12 (=−20+8). (Recall steps 1732, 1734, 1736, and 1738.) The first 32-bit storage structure 1920" shown in FIG. 19E results. Since the "BITSHIFT" variable is less than zero (0), the first 32-bit storage structure is shifted left by eight (8), byte 3 of the source sub-pixels is added to the first 32-bit storage structure, the index I is incremented to four (4), and the BITSHIFT variable is incremented by eight (8) to −4 (=−12+8). (Recall steps 1730, 1732, 1734, 1736, and 1738.) The first 32-bit storage structure 1920''' shown in FIG. 19F results. Since the "BITSHIFT" variable is still less than zero (0), the first 32-bit storage structure is shifted left by eight (8), byte 4 of the source sub-pixels is added to the first 32-bit storage structure, the index I is incremented to five (5), and the BITSHIFT variable is incremented by eight (8) to 4 (=−4+8). (Recall steps 1730, 1732, 1734, 1736, and 1738.) Since the "BITSHIFT" variable is now not less than zero (0), the contents of the first 32-bit storage structure are copied to the second 32-bit storage structure (See 1930' of FIG. 19G.), and the second 32-bit storage structure is shifted right by the variable "BITSHIFT"—in this case, shifted right by four (4). (Recall steps 1735 and 1740.) The resulting second 32-bit storage structure 1930" is shown in FIG. 19H. The contents of the second 32-bit storage structure are then logically ANDed, bit-by-bit, with the mask 1905. The output 1940 shown in FIG. 19I results. Notice that this output 1940 corresponds to the second chunk of source sub-pixels C2' to be used to derive a destination pixel.

Subsequent chunks of source sub-pixels and subsequent rows are similarly accessed.

Having illustrated an example of the operation of the method 810' of FIG. 17 where the oversample value is greater than sixteen (16), an example of the operation of the method 810' of FIG. 17 where the oversample value is less than sixteen (16) is described in § 4.4.3 below.

§ 4.4.3 EXAMPLE ILLUSTRATING THE OPERATION OF THE SECOND EMBODIMENT WHERE OVERSAMPLE RATE IS LESS THAN 16

FIGS. 20A through 20E illustrate an example of the operation of the method 810" of FIG. 17 on two (2) columns (C1, C2) of a row of source sub-pixels corresponding to an oversampling rate of ten (10), where the left side bearing remainder is four (4). FIG. 20A illustrates the 32-bit mask 2005 generated in step 1705. FIG. 20B illustrates the source sub-pixels 2010 and the affect of the left side bearing remainder on the chunks of ten (10) source sub-pixels used by the scan conversion process 812 to derive the destination pixels. At step 1715, the "BITSHIFT" variable is set to four (4) and then changed to −6 (=4−10) at step 1725. Since the "BITSHIFT" variable is less than zero (0), the first 32-bit storage structure is shifted right by eight (8) and byte 0 of the source sub-pixels are added to the first 32-bit storage structure 2020 as shown in FIG. 20C. (Recall steps 1732 and 1734 of FIG. 17.) The index count I is incremented to one (1) and the "BITSHIFT" variable is changed to 2 (=−6+8) (Recall steps 1736 and 1738.). Since the "BITSHIFT" variable is not less than zero (0), the contents of the first 32-bit storage structure are copied to the second 32-bit storage structure, the second storage structure is rotated right by "BITSHIFT" bits (that is shifted right by two (2)) (Recall steps 1735 and 1740.). The resulting second 32-bit storage structure 2030 is shown in FIG. 20D. The first chunk of source sub-pixels is determined by logically ANDing, bit-by-bit, the mask 2005 with the contents of the second 32-bit storage structure 2030. Notice that the result of this operation corresponds to C1' of FIG. 20B.

For the next destination pixel, the "BITSHIFT" variable is set to −8 (=2−10). (Recall steps 1750, 1720, and 1725.) The first 32-bit storage structure is shifted left by eight (8), byte 2 of the source sub-pixels is added to the first 32-bit storage structure, the index I is incremented to three (3), and the BITSHIFT variable is incremented by eight (8) to 0 (=−8+8). (Recall steps 1732, 1734, 1736, and 1738.) The first 32-bit storage structure 1920' shown in FIG. 20E results. Since the "BITSHIFT" variable is now not less than zero (0) (It is equal to zero (0).), the contents of the first 32-bit storage structure are copied to the second 32-bit storage structure (See 2030' of FIG. 20G.), and the second 32-bit storage structure is shifted right by the variable "BITSHIFT" (In this case, since the variable "BITSHIFT" is zero (0), no shifting actually occurs.). (Recall steps 1735 and 1740.) The resulting second 32-bit storage structure 1930' is shown in FIG. 20E. The contents of the second 32-bit storage structure are then logically ANDed, bit-by-bit, with the mask 2005. The output corresponds to the second chunk of source sub-pixels C2' to be used by the scan conversion process 812 to define a destination pixel.

Subsequent chunks of source sub-pixels and subsequent rows are similarly accessed.

Having described methods, apparatus, and data structures which may be used in accordance with the present invention, as well as an exemplary environment in which the present invention may operate, some concluding remarks regarding the invention are presented in § 4.5. below.

§ 4.5 CONCLUSIONS

In view of the foregoing, the present invention discloses methods, apparatus, and data structures for accessing the oversampled sub-pixels, also referred to as "source sub-pixels", such that the blocks of source sub-pixels to be accessed are shifted so that the left side bearing remainder 1430, 1530 is accounted for in the final display of the character. The source sub-pixels are accessed, efficiently, in blocks (or chunks) corresponding to the over-sampling rate.

What is claimed is:

1. A method for rasterizing a text character, based on character information, to be rendered on a display device having pixels each having a plurality of separately controllable pixel sub-components of different colors, the method comprising steps of:
   scaling the character information corresponding to the text character in the horizontal direction based on a horizontal scale factor to define rows of source sub-pixels; and
   converting the rows of source sub-pixels to a bitmap image in which the pixel sub-components of the display device are to be treated as independent luminous intensity elements, wherein the step of converting the rows of source sub-pixels includes a step of accessing N-bit chunks of source sub-pixels, where N is an integer greater than one and wherein the N-bit chunks of source sub-pixels are offset by a left side bearing remainder that corresponds to the remainder of a left side bearing of the text character divided by the horizontal scale factor.

2. The method of claim 1 wherein the horizontal scale factor equals N.

3. A method for accessing horizontally scaled character information, the method comprising steps of:
   a) loading a first byte of the horizontally scaled character information into a second byte of a first storage structure and a second byte of the horizontally scaled character information into a first byte of the first storage structure;
   b) copying the contents of the first storage structure to a second storage structure;
   c) shifting the contents of the second storage structure by an offset;
   d) accessing 16 bits of the second storage structure; and
   e) shifting the contents of the first storage structure left by 16 bits.

4. The method of claim 3 wherein the offset is a left side bearing remainder.

5. The method of claim 4 wherein the horizontally scaled character information has an associated oversampling factor, and
   wherein the left side bearing remainder corresponds to the remainder of a left side bearing divided by the oversampling factor.

6. The method of claim 3 wherein steps (a) through (e) are repeated for successive pairs of bytes of the horizontally scaled character information.

7. The method of claim 3 wherein the horizontally scaled character information has an associated oversampling factor of 16.

8. The method of claim 3 wherein each of the first and second storage structures is a 32-bit storage structure.

9. The method of claim 8 wherein each of the first and second storage structures can be addressed as at least one of (a) four 8-bit integers, (b) two 16-bit integers, and (c) one 32-bit integer.

10. The method of claim 3 wherein the horizontally scaled character information is stored as at least one row of source sub-pixels, and
    wherein, in each of the at least one row of source sub-pixels, steps (a) through (e) are repeated for successive pairs of bytes of the source sub-pixels.

11. A method for accessing horizontally scaled character information having an associated oversampling factor, the method comprising steps of:
    a) defining a mask storage structure based on the oversampling factor;
    b) initializing a first variable to an offset;
    c) for each chunk of source sub-pixels in a row of the horizontally scaled character information,
       i) decreasing the first variable by the oversampling factor,
       ii) if the first variable is less than zero,
          A) shifting a first storage structure left by eight,
          B) moving a next byte of the source sub-pixels into a first byte of the first storage structure,
          C) increasing the first variable by eight, and returning to step (c)(ii), and
       iii) if the first variable is at least zero,
          A) copying contents of the first storage structure into a second storage structure,
          B) shifting the storage structure right by the first variable, and
          C) logically ANDing, bit-by-bit, the contents of the second storage structure and the mask storage structure.

12. The method of claim 11 wherein the offset is a left side bearing remainder.

13. The method of claim 12 wherein the left side bearing remainder corresponds to the remainder of a left side bearing divided by the oversampling factor.

14. The method of claim 11 wherein the oversampling factor is an integer between and including 2 and 24.

15. The method of claim 11 wherein each of the first and second storage structures is a 32-bit storage structure.

16. A machine readable medium having machine executable instructions which, when executed by a machine, perform a method for rasterizing a text character, based on character information, to be rendered on a display device having pixels each having a plurality of separately controllable pixel sub-components of different colors, the method comprising steps of:

scaling the character information corresponding to the text character in the horizontal direction based on a horizontal scale factor to define rows of source sub-pixels; and converting the rows of source sub-pixels to a bitmap image in which the pixel sub-components of the display device are to be treated as independent luminous intensity elements, wherein the step of converting the rows of source sub-pixels includes a step of accessing N-bit chunks of source sub-pixels, where N is an integer greater than one and wherein the N-bit chunks of source sub-pixels are offset by a left side bearing remainder that corresponds to the remainder of a left side bearing of the text character divided by the horizontal scale factor.

17. A machine readable medium having machine executable instructions which, when executed by a machine, perform a method for accessing horizontally scaled character information, the method comprising steps of:

a) loading a first byte of the horizontally scaled character information into a second byte of a first storage structure and a second byte of the horizontally scaled character information into a first byte of the first storage structure;

b) copying the contents of the first storage structure to a second storage structure;

c) shifting the contents of the second storage structure by an offset;

d) accessing 16 bits of the second storage structure; and e) shifting the contents of the first storage structure left by 16 bits.

18. The machine readable medium of claim 17 wherein the offset is a left side bearing remainder.

19. A machine readable medium having machine executable instructions which, when executed by a machine, perform a method for accessing horizontally scaled character information having an associated oversampling factor, t e method comprising steps of:

a) defining a mask storage structure based on the oversampling factor;

b) initializing a first variable to an offset;

c) for each chunk of source sub-pixels in a row of the horizontally scaled character information,
  i) decreasing the first variable by the oversampling factor,
  ii) if the first variable is less than zero,
    A) shifting a first storage structure left by eight,
    B) moving a next byte of the source sub-pixels into a first byte of the first storage structure,
    C) increasing the first variable by eight, and returning to step (c)(ii), and
  iii) if the first variable is at least zero,
    A) copying contents of the first storage structure into a second storage structure,
    B) shifting the storage structure right by the first variable, and
    C) logically ANDing, bit-by-bit, the contents of the second storage structure and the mask storage structure.

20. The machine readable medium of claim 19 wherein the offset is a left side bearing remainder.

21. An apparatus for rasterizing a text character, based on character information, to be rendered on a display device having pixels each having a plurality of separately controllable pixel sub-components of different colors, the apparatus comprising:

a type scaler for scaling the character information corresponding to the text character in the horizontal direction based on a horizontal scale factor to define rows of source sub-pixels; and means for converting the rows of source sub-pixels to a bitmap image in which the pixel sub-components of the display device are to be treated as independent luminous intensity elements, wherein the means for converting include means for accessing N-bit chunks of source sub-pixels, where N is an integer greater than one and wherein the N-bit chunks of source sub-pixels are offset by a left side bearing remainder that corresponds to the remainder of a left side bearing of the text character divided by the horizontal scale factor.

22. The apparatus of claim 21 wherein the chunks of source sub-pixels accessed are offset by a left side bearing remainder.

23. An apparatus for accessing horizontally scaled character information, the apparatus comprising:

a) a first storage structure having a second byte for accepting a first byte of the horizontally scaled character information and a first byte for accepting a second byte of the horizontally scaled character information;

b) a second storage structure for accepting a copy of the contents of the first storage structure;

c) a first shifter for shifting the contents of the second storage structure by an offset;

d) means for accessing 16 bits of the second storage structure; and e) a second shifter for shifting the contents of the first storage structure left by 16 bits.

24. An apparatus for accessing horizontally scaled character information having an associated oversampling factor, the apparatus comprising:

a) a mask storage structure defined based on the oversampling factor;

b) a storage device for storing a first variable initialized to an offset;

c) a first storage structure;

d) a second storage structure;

e) means for, for each chunk of source sub-pixels in a row of the horizontally scaled character information,
  i) decreasing the first variable stored in the storage device by the oversampling factor,
  ii) if the first variable is less than zero,
    A) shifting contents of the first storage structure left by eight,
    B) moving a next byte of the source sub-pixels into a first byte of the first storage structure,
    C) increasing the first variable stored in the storage device by eight, and iii) if the first variable is at least zero,
   A) copying contents of the first storage structure into the second storage structure,
   B) shifting the contents of the second storage structure right by the first variable; and
f) a logical AND device for logically ANDing, bit-by-bit, the contents of the second storage structure and the mask storage structure.

25. A method for rasterizing a text character, based on character information, to be rendered on a display device having pixels each having a plurality of separately controllable pixel sub-components of different colors, the method comprising steps of:

scaling the character information corresponding the text character in the horizontal direction based on a horizontal scale factor to define rows of source sub-pixels, wherein the scaled character information includes a left side bearing value having:

a first portion that includes a number of the source sub-pixels that is an integer multiple of the horizontal scale factor; and a remainder that includes a number of the source sub-pixels that is smaller that the horizontal scale factor; and converting the rows of source sub-pixels to a bitmap image in which the pixel sub-components of the display device are treated as independent luminous intensity elements, where the step of converting the rows of source sub-pixels includes a step of accessing N-bit chunks of source sub-pixels, where N is an integer greater than one and wherein the step of accessing N-bit chunks of source sub-pixels is conducted by accessing an N-bit chunk that includes the source sub-pixels included in the remainder but does not include the source sub-pixels in the first portion of the left side bearing.

* * * * *